(12) United States Patent
Amuru et al.

(10) Patent No.: US 12,028,882 B2
(45) Date of Patent: Jul. 2, 2024

(54) BANDWIDTH PART CONFIGURATIONS FOR SINGLE CARRIER WIDEBAND OPERATIONS

(71) Applicant: Samsung Electronics Co., Ltd., Suwon-si (KR)

(72) Inventors: Saidhiraj Amuru, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 18/045,077

(22) Filed: Oct. 7, 2022

(65) Prior Publication Data

US 2023/0089294 A1  Mar. 23, 2023

Related U.S. Application Data

(63) Continuation of application No. 16/610,872, filed as application No. PCT/KR2018/005209 on May 4, 2018, now Pat. No. 11,470,616.

(30) Foreign Application Priority Data

| May 4, 2017 | (IN) | ............................. 201741015840 |
| Jun. 16, 2017 | (IN) | ............................. 201741021119 |
| May 2, 2018 | (IN) | ............................. 201741015840 |

(51) Int. Cl.
*H04W 72/53* (2023.01)
*H04B 7/0452* (2017.01)
(Continued)

(52) U.S. Cl.
CPC .......... *H04W 72/53* (2023.01); *H04B 7/0452* (2013.01); *H04L 5/0092* (2013.01);
(Continued)

(58) Field of Classification Search
CPC ............... H04W 72/53; H04W 56/001; H04W 72/0453; H04W 72/23; H04W 48/10;
(Continued)

(56) References Cited

U.S. PATENT DOCUMENTS

| 10,893,518 B2 | 1/2021 | Shen |
| 2007/0206559 A1 | 9/2007 | Cho et al. |

(Continued)

FOREIGN PATENT DOCUMENTS

| CN | 101421945 A | 4/2009 |
| CN | 103348621 A | 10/2013 |

(Continued)

OTHER PUBLICATIONS

Notification of Fulfilling of Registration Formality dated Nov. 9, 2023, in connection with Chinese Application No. 201880029721.1, 12 pages.

(Continued)

*Primary Examiner* — Yaotang Wang

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

Embodiments disclosed herein provide a method for managing a resource in a wireless communication system. The method includes allocating, by a base station, the resource for a data transmission from a User Equipment (UE) by indicating at least one bandwidth part in a total bandwidth (Continued)

supported by the UE. The resource is further allocated by indicating a Physical Downlink Control Channel (PDCCH) and a Physical Downlink Shared Control Channel (PDSCH) according to a configured subcarrier spacing and a CP length within the at least one bandwidth part, and by indicating an allocation of Resource Blocks (RBs) within the at least one bandwidth part.

16 Claims, 22 Drawing Sheets

(51) Int. Cl.
  *H04L 5/00* (2006.01)
  *H04L 27/26* (2006.01)
  *H04W 56/00* (2009.01)
  *H04W 72/0453* (2023.01)
  *H04W 72/23* (2023.01)

(52) U.S. Cl.
  CPC ........ *H04L 5/0094* (2013.01); *H04L 27/2607* (2013.01); *H04W 56/001* (2013.01); *H04W 72/0453* (2013.01); *H04W 72/23* (2023.01)

(58) Field of Classification Search
  CPC ... H04B 7/0452; H04L 5/0092; H04L 5/0094; H04L 27/2607; H04L 5/001; H04L 5/0044; H04L 5/0091; H04L 5/0007
  See application file for complete search history.

(56) References Cited

U.S. PATENT DOCUMENTS

| | | |
|---|---|---|
| 2013/0028182 A1 | 1/2013 | Geirhofer et al. |
| 2015/0092563 A1 | 4/2015 | Tabet et al. |
| 2015/0305035 A1 | 10/2015 | Hu et al. |
| 2016/0352551 A1 | 12/2016 | Zhang et al. |
| 2018/0183551 A1* | 6/2018 | Chou .................. H04W 74/006 |
| 2020/0067676 A1 | 2/2020 | Yi |
| 2020/0274750 A1 | 8/2020 | Yi et al. |

FOREIGN PATENT DOCUMENTS

| | | |
|---|---|---|
| CN | 103959694 A | 7/2014 |
| CN | 104272831 A | 1/2015 |
| EP | 2302830 A2 | 3/2011 |
| WO | 2013025547 A2 | 2/2013 |
| WO | 2014069946 A1 | 5/2014 |
| WO | 2016130175 A1 | 8/2016 |

OTHER PUBLICATIONS

Communication pursuant to Article 94(3) EPC dated Sep. 8, 2023, in connection with European Application No. 18794420.2, 5 pages.
ISA/KR, International Search Report and Written Opinion of the International Searching Authority, International Application No. PCT/KR2018/005209, Aug. 28, 2018, 10 pages.
Huawei, et al., "Resource allocation and indication for data channel," R1-1705069, 3GPP TSG RAN WG1 Meeting #88bis, Spokane, USA, Apr. 3-7, 2017, 8 pages.
Intel, et al., "Way forward on PRB indexing," R1-1711855, 3GPP TSG-RAN WG1 Ad-Hoc #2, Qingdao, P.R. China, Jun. 27-30, 2017, Decision, AI: 5.1.7, 2 pages.
LG Electronics, "Discussion on CSS configuration for wideband operation," R1-1704906, 3GPP TSG RAN WG1 Meeting #88bis, Spokane, USA, Apr. 3-7, 2017, 5 pages.
LG Electronics, et al., "WF on configuration of a BWP in wider bandwidth operation," R1-1711812, 3GPP TSG RAN1 NR Ad-Hoc #2, Qingdao, P.R. China, Jun. 27-30, 2017, Agenda item: 5.1.7, 2 pages.
Samsung, et al., "WF on CSI-RS," R1-1711787, 3GPP TSG RAN WG1 Ad-Hoc #2, Qingdao, P.R. China, Jun. 27-30, 2017, Agenda item: 5.1.2.4.2, 6 pages.
VIVO, "Discussion on NR resource allocation," R1-1704501, 3GPP TSG RAN WG1 Meeting #88bis, Spokane, USA, Apr. 3-7, 2017, 3 pages.
Xinwei, et al., "WF on DL PRB Bundling," R1-1711990, 3GPP TSG RAN WG1 RAN1 NR Ad hoc #2, Qingdao, P.R. China, May 27-30, 2017, Agenda item: 5.1.2.1.5, 3 pages.
The First Office Action dated Feb. 23, 2023, in connection with Chinese Application No. 201880029721.1, 19 pages.
Office Action dated May 3, 2023, in connection with Korean Application No. 10-2019-7032688, 9 pages.
Huawei, et al., "Evaluation on subcarrier spacing and CP types for UL transmission," R1-1609426, 3GPP TSG RAN WG1 #86bis, Lisbon, Portugal, Oct. 10-14, 2016, 5 pages.
Huawei, et al., "Discussion on resource block for NR," R1-1609429, 3GPP TSG RAN WG1 #86bis, Lisbon, Portugal, Oct. 10-14, 2016, 5 pages.
NEC, "Resource allocation schemes for NR," R1-1704651, 3GPP TSG-RAN WG1 Meeting #88bis, Spokane, USA, Apr. 307, 2017, 4 pages.

* cited by examiner

BANDWIDTH PART CONFIGURATIONS FOR SINGLE CARRIER WIDEBAND OPERATIONS

CROSS-REFERENCE TO RELATED APPLICATIONS

This application is a continuation of application Ser. No. 16/610,872, now U.S. Pat. No. 11,470,616, which is the 371 National Stage of International Application No. PCT/KR2018/005209, filed May 4, 2018, which claims priority to Indian Provisional Patent Application No. 201741015840, filed May 4, 2017, Indian Provisional Patent Application No. 201741021119, filed Jun. 16, 2017, and Indian Non-Provisional Patent Application No. 201741015840, filed May 2, 2018, the disclosures of which are herein incorporated by reference in their entirety.

BACKGROUND

1. Field

The embodiments herein relate to a method and system for control resource sets and reference signals for the bandwidth parts used for single carrier wideband operations of users operating in future wireless systems.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The Third Generation Partnership Project (3GPP) $5^{th}$ generation telecommunication is expected to support wide range of services including enhanced mobile broadband, ultra-reliable and low latency communication, massive machine type communications, etc. Each service has its own specific set of requirements, which is expected to be catered by a cellular network. For instance, the enhanced mobile broadband requires high speed of data transfer, the ultra-reliable low latency communication requires data transfer with very low latency but may not require high data rate, while the massive machine type communications may have the requirement to minimize power consumption of a user equipment (UE). In order to cater for different requirements, the cellular network can partition radio resources such that each set of radio resources can meet the requirements of a given service by using different physical layer configurations. This is also called Radio Access Network (RAN) slicing.

In a 5G system, it would be possible for the UE to access multiple services concurrently, hence RAN procedures are required to be designed such that different physical layer configurations can be operated efficiently by the UE without hampering any of the service requirements. It is expected that single Medium Access Control (MAC) entity could possible support multiple physical layer configurations or numerologies simultaneously. Hence, many MAC procedures (e.g. buffer status report, multiplexing, scheduling request) are expected to be common for different physical numerologies.

The above information is presented as background information only to help the reader to understand the present invention. Applicants have made no determination and make no assertion as to whether any of the above might be applicable as Prior Art with regard to the present application.

SUMMARY

In order to support multiple physical layer configurations, it is expected that the cellular network may need to support bandwidth on the order of 1 GHz in a single carrier manner. In other words, without using carrier aggregation, a user of the 5G system must support bandwidths of this order. Several challenges arise in this regard as the user of the UE must support wide bandwidth such as Radio Frequency (RF), power consumption, scheduling etc. Since the user of the UE need not always support such wide bandwidth, the concept of 1st and 2nd RF bandwidth have been introduced. These 1st RF and 2nd RF bandwidths may be understood as narrow and wide band width parts that may be configured to the UE. However, the goal is to avoid the user of the UE from monitoring wide bandwidth all the time as it is not power efficient. But however, there should be ability to configure the user of the UE for such wide bands to support very high data rate requirements. Furthermore, the wide bandwidth is available in above 6 GHz bands and hence can be used effectively.

Accordingly, embodiments disclosed herein provide a method for managing a resource in a wireless communication system. The method includes allocating, by a base station, the resource for a data transmission from a User Equipment (UE) by indicating at least one bandwidth part in a total bandwidth supported by the UE. The resource is further allocated by indicating a Physical Downlink Control Channel (PDCCH) and a Physical Downlink Shared Control Channel (PDSCH) according to a configured subcarrier spacing and a CP length within the at least one bandwidth part, and by indicating an allocation of Resource Blocks (RBs) within the at least one bandwidth part.

In an embodiment, each of the at least one bandwidth part in the total bandwidth supported by the UE are allocated to support different numerology.

In an embodiment, the UE is not capable of supporting a carrier bandwidth.

In an embodiment, the number of resource blocks (RBs) in each of the at least one bandwidth parts is determined based on a numerology and a size associated with corresponding bandwidth part.

In an embodiment, the base station identifies whether a size of a group of the RBs for each of the bandwidth parts are one of same and different and cause to one of perform multiple user multiple in multiple out (MU-MIMO) multiplexing when the size of the group of the RBs for each of the bandwidth parts are same and signal UEs about a size of a group of the RBs to be used and perform MU-MIMO multiplexing.

In an embodiment, the at least one bandwidth part comprises a CORESET at a default location defined based on a size of the at least one bandwidth part.

In an embodiment, the PDSCH and the corresponding PDCCH are transmitted within a same bandwidth part when a PDSCH transmission starts no later than K symbols after an end of the PDCCH transmission.

In an embodiment, the PDSCH and the corresponding PDCCH are transmitted within a different bandwidth parts when a PDSCH transmission starting more than K symbols after an end of the corresponding PDCCH.

Accordingly, embodiments disclosed herein provide a method for managing a resource in a wireless communication system. The method includes determining by a base station whether a reference point requires one of Common PRB indexing and a Local UE specific PRB indexing and performing by the BS one of, indicating to the UE via a RMSI about the reference point for the common PRB indexing for RS generation and indicating to the UE via a one of a RRC signaling and a UE specific signaling about the reference point for the local specific PRB indexing for resource allocation.

In an embodiment, the reference point is one of a centre frequency of a wideband carrier, an edge frequency of a wideband carrier, a synchronization signal (SS) block, a channel number used for synchronization, a channel raster in terms of an Absolute Radio Frequency Channel Number (ARFCN), a centre frequency of RMSI BW and an edge frequency of RMSI BW.

Accordingly, embodiments disclosed herein provide a method for managing a resource in a wireless communication system. The method includes allocating, by a base station, the resource for a data transmission from a User Equipment (UE) by:
 a. identifying a discontinuous spectrum regions;
 b. identify a BW part that supports a synchronization signal (SS) block
 c. activating a secondary BW part without the SS block;
 d. configuring a CSI-RS location for measurements on the secondary BW part without SS block for the UE; and
 e. indicating to the UE the CSI-RS location and not to use SS on the secondary BW part.

Accordingly, embodiments disclosed herein provide a method for managing a resource in a wireless communication system. The method includes configuring, by a User Equipment (UE), the resource for a data transmission by:
 a. configuring at least one bandwidth part indicated by a base station in a total bandwidth supported by the UE;
 b. configuring a PDCCH and a PDSCH according to a configured subcarrier spacing and a CP length within the at least one bandwidth part indicated by the base station; and
 c. configuring at least one Resource Block (RB) within the at least one bandwidth part indicated by the base station.

In an embodiment, the PDSCH and the corresponding PDCCH are transmitted within a same bandwidth part when a PDSCH transmission starts no later than K symbols after an end of the PDCCH transmission.

In an embodiment, the PDSCH and the corresponding PDCCH are transmitted within a different bandwidth parts when a PDSCH transmission starting more than K symbols after an end of the corresponding PDCCH, wherein the K symbols can be UE specific parameter dependent upon UE capability indicated by the UE to the gNB or can be fixed in the specifications which can further be indicated to the UE by the gNB.

In an embodiment, the method further includes determining by the UE that a size of the at least one bandwidth part is one within a frequency range and re-tuning determining by the UE that a size of the at least one bandwidth part is one within a frequency range.

In an embodiment, determining by the UE that a size of the at least one bandwidth part is one within a frequency range.

In an embodiment, the UE is not capable of supporting a carrier bandwidth.

Accordingly, embodiments disclosed herein provide a method for managing a resource in a wireless communication system. The method includes tuning, by a UE, to a frequency range, tuning, by a UE, to a frequency range and performing by the UE the data transmission within the at least one active bandwidth parts using associated numerology of the at least one active bandwidth part.

In an embodiment, the UE does not span the frequency range larger than the bandwidth part of the UE in a component carrier.

In an embodiment, the at least one active bandwidth part comprising at least one Resource Block (RB) and a PDCCH and a PDSCH according to a configured subcarrier spacing and a CP length.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to provide configurations for control resource sets and reference signals for the bandwidth parts used for single carrier wideband operations of users operating in future wireless systems.

Another object of the embodiments herein is to disclose several configurations for single carrier wideband operations for the 5G systems such as CORESET generation.

Another object of the embodiments herein is to provide control search space and control resource set configurations.

Another object of the embodiments herein is to provide a plurality of configurations needed for performing single carrier wideband operations.

Another object of the embodiments herein is to allocate a resource for a data transmission from a User Equipment (UE) by indicating a bandwidth part in a total bandwidth supported by the UE.

Another object of the embodiments herein is to allocate the resource by indicating a Physical Downlink Control Channel (PDCCH) and a Physical Downlink Shared Control Channel (PDSCH) according to a configured subcarrier spacing and a CP length within the bandwidth part.

Another object of the embodiments herein is to allocate the resource by indicating an allocation of Resource Blocks (RBs) within the bandwidth part.

Another object of the embodiments herein is to determine whether a reference point requires one of Common Physical Resource Block (PRB) indexing and a Local UE specific PRB indexing.

Another object of the embodiments herein is to indicate to the UE via a Remaining Minimum System Information (RMSI) about the reference point for the common PRB indexing for Resource Set (RS) generation.

Another object of the embodiments herein is to indicate to the UE via a one of a Radio Resource Control (RRC) signaling and a UE specific signaling about the reference point for the local specific PRB indexing for resource allocation.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

Figure 1:
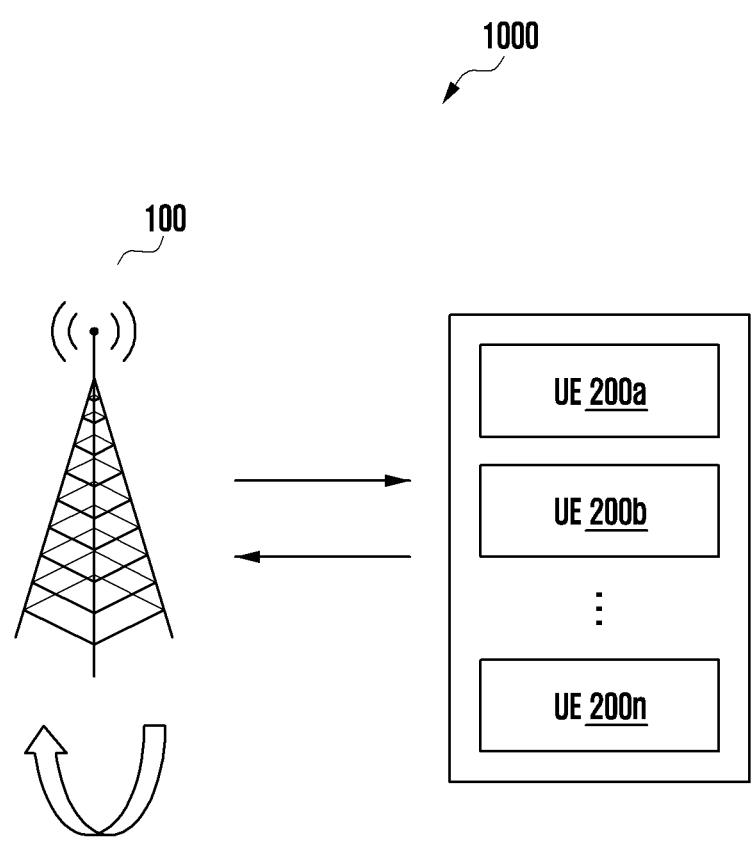
FIG. 1 is a general overview of an architecture for managing a resource in a wireless communication system 1000, according to an embodiment as disclosed herein.
Figure 2:
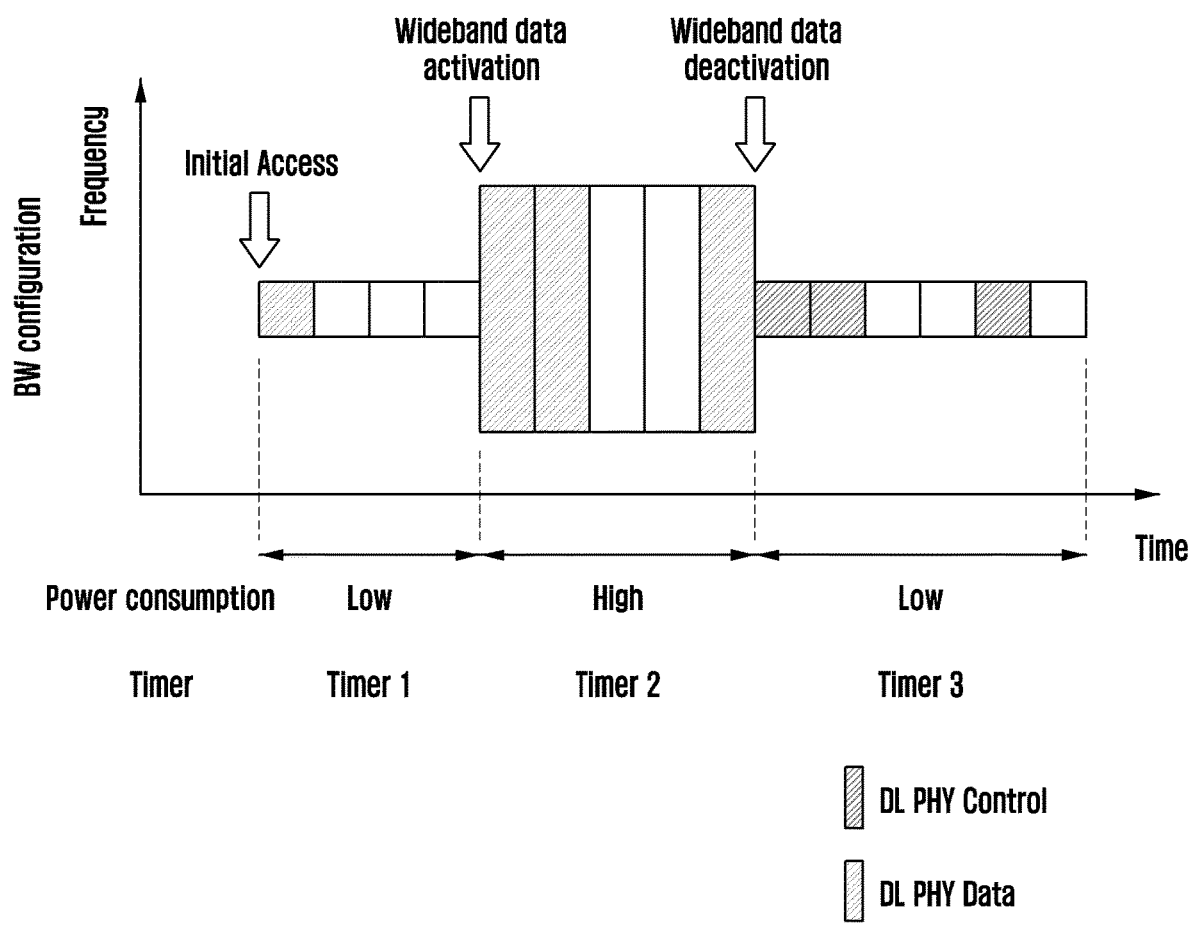
FIG. 2 scanning of bandwidths by the UE, according to an embodiment as disclosed herein.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. Accordingly, the examples should not be construed as limiting the scope of the embodiments herein. Further it should be possible to combine the flows specified in different figures to derive a new flow.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. Abbreviations used herein include gNB—5G base station, UE—User Equipment, UL—Uplink and DL—Downlink.

Embodiments herein discuss the various bandwidth adaptation aspects for the 5G and future wireless systems. Bandwidth (BW) part concept is a subset of the frequency range concept. For instance, a UE is tuned to a specific frequency range (A or B). Inside this frequency range A (or B), one or several BW parts may exist as defined by the NW (network). Then the user may be allotted some BW parts depending on the existing scenario. It is understood that the size of the frequency range A and a BW part must be at least the size of SS block bandwidth, which is the minimum BW a NR UE must support. Hence a frequency range consists of at least 1 BW part. Each BW part can be disjoint of another BW part to avoid any ambiguity in resource allocation.

For the case of BW adaption, a UE may be requested to either change the frequency range or within the same frequency range multiple BW parts may be allotted to the user. Hence 2 levels of BW adaption are possible. For instance, the frequency range re-tuning involves the RF retuning which may require additional time than the adaption timeline required when multiple BW parts are allotted within a same frequency range. Furthermore, for frequency range adaption, it must be taken care that NR-PDCCH is always present in the frequency range that the UE adapts to.

Embodiments herein disclose a base station for managing a resource in a wireless communication system. The base station includes a resource controller communicated to a memory and a processor. The resource controller is configured to allocate the resource for a data transmission for a UE in a two-step frequency-domain assignment process as a) indicating at least one bandwidth part, and b) indicating at least one RB within the at least one bandwidth part.

Unlike conventional methods and systems, the proposed method can be used to avoid wastage of the radio resources by optimal resource allocation. The proposed method supports a high data rate and enables power savings via dynamic configurations of the resource allocation. The method can be used to schedule uplink transmissions based on service and physical layer numerology requirements. The method can be used to activate and deactivate and provide a configuration sharing between multiple scheduling request resources in an effective manner. The method can be used to prevent a numerology blockage issue which hinders scheduling of urgent services.

Unlike conventional methods, embodiments herein disclose a method for managing a resource in a wireless communication system. The method includes allocating, by a base station, the resource for a data transmission from a User Equipment (UE) by indicating at least one bandwidth part in a total bandwidth supported by the UE. The resource is further allocated by indicating a PDCCH and a PDSCH according to a configured subcarrier spacing and a CP length within the at least one bandwidth part, and by indicating an allocation of Resource Blocks (RBs) within the at least one bandwidth part.

The following terminology is used in the patent document.

BW region: Size and location of a bandwidth under consideration.

Initial Access BW: In the BW region, where the UE performs initial measurements and RA procedure-related reception. Further, in the initial access BW, Primary Synchronization Signal (PSS), Secondary Synchronization Signal (SSS) and other reference signals (if any) will be transmitted. In the initial access BW, the BW size is not more than 5 or 20 MHz for <6 GHz systems and not more than 40 or 80 MHz for >6 GHz systems.

Minimum Radio resource management (RRM) BW: The RRM BW region needed by the UE in the RRC IDLE mode.

RRM BW: This is the BW region and in an RRC_CONNECTED mode, the UE monitors for performing RRM measurements (for e.g. handover purposes).

1st RF and 2nd RF BW: These are UE specific BW regions that can be configured after initial access for the UE in the connected mode. While the 1st RF BW is for New Radio-Physical downlink Control Channel (NR-PDCCH) transmission, the 2nd RF BW can be used for both NR-PDCCH (if deemed necessary beyond the contents of the 1st RF BW) and PDSCH transmissions. Other usage cases, such as for a channel state information reference symbol (CSI-RS), are not precluded. The 1st RF BW is typically a narrow bandwidth part while the 2nd RF BW is a wider bandwidth part. This is to help for power savings for the UE. The UE may be instructed to switch to and from the 1st RF BW and the 2nd RF BW for power saving when the data usage is not very high.

BW's monitored by a RRC_IDLE UE: Initial Access and Minimum RRM BW.

BW's monitored by a RRC_CONNECTED UE: RRM BW, 1st and 2nd RF BW.

Accordingly the invention provides a several configurations for single carrier wideband operations for the 5G systems such as Control Resource Set (CORESET) and resource set (RS) generation.

Accordingly the invention provides a control search space and control resource set where the search space is location.

In the context of new radio (NR) wider bandwidth operation, two aspects are considered, namely, UE radio frequency (RF) bandwidth adaptation and coexistence among narrow band UEs and wideband UEs within a wideband NR carrier. The primary benefit for UE RF bandwidth adaptation is UE power saving. Supporting multiple UE types/categories within a wideband NR carrier allows implementation flexibility.

Radio Resource Control (RRC) Parameters: The following RRC parameters are identified for the wideband operations:

a) Semi-static configuration of the BW parts is indicated to the UE via RRC signaling. The activation can be done via Downlink Control Information (DCI) or Media Access Control-Control Elements (MAC-CE). Dynamic activation can enable more power savings than RRC level activation.

b) Multiple synchronization signal (SS) blocks can be indicated to the wideband UE via RRC signaling in the connected mode. This is used by the wideband UE to perform rate matching around the SS block locations. Case-3 UE may also be informed of the other SS block locations only via RRC signaling in the connected mode as the UE need not operate with very wide bandwidth from the initial access stage. A NB UE may be informed of the other SS block locations for its RRM measurements by providing retuning gaps. Each UE must also be indicated which SS block is the default SS block (and default BW part) which it must use for its idle mode operations, fallback mode operations among others. Appropriate RRC parameters are needed for these indications.

Default BW part definition and configuration—For initial access to obtain minimum system information, RAR, Msg4 during RACH procedure a default BW part is not needed as the UE gets RMSI scheduling from PBCH and then RAR, Msg4 scheduling is obtained. A single CSS is used to schedule system information, random access messages, and possibly paging. Some use cases for the default BW part include:

a) Saving RRC-layer signaling overhead if a UE is a low capability UE b) Fallback operations if the indication of active DL BW part is missed by a UE c) DRX operation or IDLE mode operation, e.g. UE monitors PDCCH or paging messages over it.

This default BW part could be one among the BW parts configured to the UE by the gNB or it could be the initial BW part which is used by the UE for the initial access purposes.

In these cases, to avoid new signaling, the default SS block BW is sufficient to be defined as a default BW part. While it is mentioned that certain DL bandwidth of NR that all UE can support in each frequency range, it is not clear what "certain" would refer to. Since it is clear that every NR UE must support at least the SS block BW, defining this as the BW for the default BWP seems sufficient.

A default SS block location may be defined per UE based on the UE operations and the SS block BW may be designated as the default BWP for this UE. For example, UE1 reads SS block in BWP1 for initial access, and the UE assumes the BWP1 as default initially; UE2 reads SS block in BWP2 for initial access, and the UE assumes the BWP2 as default initially. In this case, the default BWP is the BWP UE has read SS block in. Later on, for load balancing purposes, the network may decide to turn off SS block in BWP2, and may request UE2 change its default BWP location.

A similar design and concept seems valid for the case of UL. For PRACH, the time frequency locations for performing RACH is obtained via RMSI and no additional default BW part indication is needed here. There could be other use cases for the default upper link (UL) bandwidth (BW) part.

a) to save RRC-layer signaling overhead if a UE is a low capability UE b) for fallback if the indication of active UL BW part is missed by a UE Similar to DL case, to avoid new signaling, the SS block BW is enough to be defined as a default BW part for UL operations as well. For TDD systems, the DL and UL may share the same location of default BW part while for FDD systems, default DL and UL BW parts may be separated.

Once the anchor SS block is scanned, the default BW part can be located around the center of this SS block. Another option is that the CORESET alone is located around this SS block location. The CORESET configures all information needed for further procedures. For default BWP located around center of SS block, the CORESET can be located anywhere inside the default BWP. This gives lot of flexibility to a gNB, while accounting for any reserved resources and so on.

The limiting factor for this initial access procedure is to find out the location of the CORESET. If the CORESET is located around same center as PBCH, then it is enough to reduce UE complexity.

a) If the maximum size of initial access CORESET is "X" RBs and is fixed, a UE may proceed with the initial access procedure by just assuming that "X" RBs are centered on PBCH.

b) But if the CORESET size is configurable and "X" can change, then it helps to have some more limitations on the BWP so that a UE can assume the CORESET lies anywhere inside this BWP and will be indicated via MIB using some extra bits. These bits could be used for indicating both time and frequency locations of this CORESET.

For option (a), no more details may be needed in the MIB as per my understanding.

Referring now to the drawings and more particularly to FIGS. 1 through 22, where similar reference characters denote corresponding features consistently throughout the figure, there are shown preferred embodiments.

FIG. 1 is a general overview of an architecture for managing a resource in a wireless communication system 1000, according to an embodiment as disclosed herein. The wireless communication system 1000 includes a base station 100 and a set of UEs 200a-200n (Hereafter referred to as the "UE 200"). The UE 200 can be, for example but not limited to, a cellular phone, a tablet, a smart phone, a laptop, a Personal Digital Assistant (PDA), a global positioning system, a multimedia device, a video device, a game console, or the like.

The UE 200 may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The UE 200 is compliant with multiple, different communication protocols that can operate as a multi-mode device by communicating within a 5G network.

The base station 100 may also be referred to as a base transceiver station, a radio base station, a radio transceiver, a transceiver function, a basic service set (BSS), an extended service set (ESS), an eNB, or the like.

In an embodiment, the base station 100 is configured to allocate the resource (i.e., bandwidth) for the data transmission for the UE 200 in a frequency-domain assignment process as a) indicating at least one bandwidth part (i.e., primary resource set), indicating a PDCCH and a PDSCH according to a configured subcarrier spacing and a CP length within the at least one bandwidth part, and indicating a number of Resource Blocks (RBs) within the at least one bandwidth part. The number of RBs in each of the bandwidth parts is determined based on a numerology associated with corresponding bandwidth part.

In an embodiment, the bandwidth part controls the at least one RB for the UE 200 in an on-off manner. The UE 200 is not capable of supporting a carrier bandwidth. In an embodiment, the UE 200 is first indicated the bandwidth part and then the at least one RB inside the bandwidth part is informed to the UE 200 based on a dedicated signaling. In an embodiment, each bandwidth part in the total bandwidth supported by the UE 200 is allocated to support different numerology. The number of RBs in each bandwidth part is determined based on a numerology and a size associated with a corresponding bandwidth part.

In an embodiment, the base station 100 is configured to allocate the resource for the data transmission from the UE 200 by indicating the active time period of at least one RB within the bandwidth part. In an embodiment, the active time period indicates the activation and deactivation of the at least one RB within the bandwidth part for the data transmission from the UE 200.

In an embodiment, a size of a groups of the RBs depends on a duration of the data transmission. The number of RBs are indicated using one of different DCI formats, a flag in a DCI format for interpreting a RA type, a flag in a DCI format for interpreting an allocation of RBs from among a defined groups of RBs sizes, explicit indication of an allocation of RBs via a DCI and an implicit determination based on a size of a configured bandwidth part.

In an embodiment, the active time period is indicated by the base station 100 using at least one of an explicit DCI signaling, an implicit DCI signaling, a MAC CE signaling, a time pattern and a DRX signaling.

In an embodiment, the bandwidth part controls the at least one RB for the UE 200 by activating and de-activating the at least one RB in the bandwidth part.

In an embodiment, the base station 100 configures the bandwidth part including a search space indicating the location of at least one RB for the data transmission from the UE 200 and signals the bandwidth part to the UE 200.

In an embodiment, the base station 100 is configured to monitor a UE common information (for RRC connected UE's) in a common search space (CS S). Further, the base station 100 is configured to monitor a common per-beam information in above 6 GHz systems in a UE search space (USS). Further, the base station 100 is configured to monitor the dedicated search spaces for UE specific configurations and obtains configurations for the 2nd RF BW (if needed). The location of search spaces for the UE 200 depends on the UE's 1st RF bandwidth, 2nd RF bandwidth and a system bandwidth.

In an embodiment, the configuration of the DL bandwidth part includes at least one CORESET. The CORESET contains the search space for the DCI. The maximum bandwidth for the CORESET for a Remaining Minimum System Information (RMSI) scheduling and NR-PDSCH carrying the RMSI should be equal to or smaller than a certain DL bandwidth of NR that all UE 200 can support in each frequency range, so that the UE 200 is only assumed to receive/transmit within the active DL/UL bandwidth part(s) using the associated numerology.

In an embodiment, the base station 100 is configured to manage the at least one scheduling request for the resource by receiving capability information to support at least one physical layer configuration from the UE 200, and configuring the at least one physical layer configuration for the at least one scheduling request for the UE 200. Various aspects to be considered for managing the resource in the wireless communication system 1000 is subsequently discussed in the patent disclosure.

Wide Bandwidth Support Bandwidths: While 5G considers communications, it is not necessary for the UE 200 to always monitor a wide BW, and the 1 GHz single carrier operation can be accompanied by the 1st RF and 2nd RF BW operations/configurations to realize the UE power savings (a main KPI for 5G). Aspects to be considered when configuring the 1st RF BW and 2nd RF BW to the UE 200 are subsequently discussed.

Initial Access and minimum RRM BW: In the initial access BW region, PSS/SSS and other reference signals (if any) are present. For above 6 GHz, a RS may include beam specific mobility RS that can be used for identifying a best beam during an initial access stage. The BWs associated with a random access may be configurable by an explicit signaling and/or may depend on a locations or size of a random access response which is considered to be a part of the initial access BW. Further, the BW required for monitoring paging messages is considered to be part of the initial access BW. In fact, all the UE procedures, before dedicated resources are configured, need to be supported in the initial access BW. This may include a NR-PDCCH and possibly a physical downlink shared channel (NR-PDSCH) decoding for a random access response, connection establishment, system information delivery and paging. Otherwise, the UE 200 will have to retune its RF frequently and the associated signaling overhead is not negligible either. However, additional NR-PDSCH resources outside of the initial access BW may be considered for enhancing a system capacity. For instance, the NR-PDCCH in the initial access BW indicates the NR-PDSCH resources outside the initial access BW. The RF re-tune time should be taken into account when choosing the NR-PDSCH resource in this case.

Further, a paging (which is considered to be part of the initial access procedures) BW need not be same as the initial access BW as it depends on the NR-PDSCH locations obtained in the NR-PDCCH decoded as part of the paging message. NR-PDCCH decoding is frequent as the UE 200 needs to monitor it every DRx cycle. In order to avoid high power consumption, the new radio Physical Downlink Control Channel BW (NR-PDCCHBW) is preferably small in size (definitely not orders of magnitude higher than the LTE case).

Having a wide bandwidth allows to support a large number of users, so as to increase a paging capacity to support a massive number of users. But if the UE 200 monitors such a wide band, the power consumption massively rises due to the hardware complexities (high sampling rate, filters etc.). The issue is also relevant for the case when the UEs 200 are required to monitor the PDSCH message that does not contain it's (a UE's) own identity. Considering these aspects RAN should consider whether there is any requirement for the PDSCH BW to be different from and larger than the NR-PDCCH BW for paging purposes.

The minimum RRM BW is used for a Reference Signal Receive Power (RSRP) and Reference Signal Received Quality (RSRQ) measurements by the UE 200 in the RRC IDLE mode. Further, a common RS is preferred for the idle mode and the connected mode to enable RSRP/RSRQ measurements. Furthermore, the SSS and the mobile relay station-1 (MRS-1) are preferred as the RS for <6 GHz and >6 GHz respectively for RRM purposes. Hence, the minimum RRM BW size is equal to the initial access BW size. Also, in the idle mode, the UE 200 only monitors the BW regions. Overall, the UE 200 must at least monitor and supports a UE-minimum bandwidth equal to the initial access bandwidth.

RRM BW: The RRM BW is used by the UE 200, in the RRC connected mode, for performing the RRM measurements (for e.g. handover purposes). The RRM BW can be a) same as the initial access BW orb) larger than the initial access BW. Further, the SSS and the BRS are potential the RS to be used for these purposes. When the SSS is used, the RRM BW is same as the initial access BW. For case (b), the BRS bandwidth may be configured to be the full BW so that measurement accuracy needs to be higher. Also, the BRS can also be used for connected mode RRM measurement within the UE-specific RRM BW. Hence, the RRM BW size is greater than or equal to the initial access BW size.

It is generally desirable to avoid having the UE 200 to re-tune in order to perform inter-cell measurements. This will also require some network coordination where the base station 100 indicates to the UEs 200 the RRM BW for adjacent cells. It is therefore beneficial if the RRM measurements are performed over the BW that should preferably be common among cells. It is also clear that for the RRM measurements, wide bandwidth measurements are always more accurate. Hence, the bandwidth of the RRM signals must also be a design choice. On the other hand, the narrow RRM BW measurements can be fast, the power savings of the UE 200 is enabled, but also not very accurate. These tradeoffs must be considered in details. Below shown in Table 1 is the LTE measurement configuration. Similar concepts are needed for the 5G system and future wireless systems also. Of course the sizes for 5G will change/scale based on the bandwidth under consideration.

TABLE 1

| Configuration | Physical Layer Measurement period: $T_{Measurement\_Period\_Inter\_FDD}$ [ms] | Measurement bandwidth [RB] |
| --- | --- | --- |
| 0 | $480 \times N_{freq}$ | 6 |
| 1 | $240 \times N_{freq}$ | 50 |

1st RF BW: As mentioned earlier, the 1st RF BW is configured only for the UE 200 in the connected mode. One issue is whether or not the 1st RF BW can be smaller than the initial access BW. Depending on the use cases for the 1st RF BW, its BW values can be defined.

The following are some of the purposes identified for the 1st RF BW:

a) Monitor the UE common information (for RRC Connected UE's), b) Monitor the common per-beam information in above 6 GHz systems, c) Monitor dedicated search spaces for UE specific configurations and to get configurations for the 2nd RF BW (if needed), and d) Support RRM measurements (if the RRM BW is inside the 1st RF BW).

Therefore,

1) Some part of the 1st RF BW can be UE specific, and

2) The 1st RF BW can overlap with the RRM BW region.

Flexible Configurations for several UE's 200: The 1st RF BW should allow multiplexing of the NR-PDCCH transmissions for the relatively large number of UEs 200. Therefore, the 1st RF BW's of UEs 200 should overlap (i.e. have common parts for different UEs) in order for UEs 200 to monitor UE-common information (over a common search space) while also allowing some UE specific configurations. Specifically, if the location of the 1st RF BW is common for all UEs 200, there is no flexibility for further UE-specific configurations. When locations for the 1st RF BW are not identical among UEs 200, common control channel information may need to be duplicated in each UE-specific BW. The base station 100 can choose between these options and accordingly, some UEs 200 may have a common part in their 1st RF BW while others may have dedicated location and duplicate UE-common information. A PCFICH type signaling may be used in these cases to support for backward compatibility.

RRM considerations for 1st RF BW: For RRM measurements, when the UE 200 is using the 1st RF BW, the following options exist: (i) RRM BW is inside the 1st RF BW, (ii) RRM BW is separate from the 1st RF BW, and (iii) new RS insides the 1st RF BW for measurement purposes.

For option (i), the 1st RF BW of UEs 200 overlaps with the RRM BW that is provided by the base station 100. For example, when the RRM BW spans the entire BW, then there are RRM signals present inside the UE's 200 1st RF BW that enable RRM measurements. For these cases i.e., when the RRM BW spans the entire NW BW, no new configurations are needed from the NW side for configuring the 1st RF BW for the RRM measurements. However, when the RRM BW is the same as the initial access BW (as mentioned earlier, when the SSS is used for RRM measurements, the RRM BW is same as initial access BW), then the base station 100 has to configure the 1st RF BW for all UEs 200 to overlap with the RRM BW region which can limit the ability to flexibly configure the 1st RF BW to the UEs 200.

For option (ii), the 1st RF BW is separated from the RRM BW. This case occurs when the RRM BW is same as the initial access BW. In such a setting, the base station 100 can configure measurement gaps while accounting for a re-tuning delay necessary for the UE 200 to switch its RF from 1st RF BW region to the RRM BW region. This can increase the burden on a side of the base station 100 and also increases the power consumption at the UE 200 due to this frequent re-tuning.

For option (iii), the re-tuning of the UE 200 is avoided but the base station 100 needs to provide new RS for the measurements (i.e., measurement RS) inside each 1st RF BW region. This option increases the signaling overhead.

Considering the above options and associated tradeoffs, option (iii) seems least favorable considering the signaling overhead. Considering the fact that option (ii)-type configuration is already supported in the LTE (e.g. for eMTC), the base station 100 can decide to either support option (i) or option (ii).

While it is preferred that the neighbor cell RRM BW is same as the RRM BW of the serving cell, the UE 200 may need to re-tune during measurement gaps when this does not happen. For example, this may happen in cases of inter-frequency measurements. Depending on the input from the RAN for the re-tuning timelines, appropriate configurations for the 1st and 2nd RF BW can be designed.

2nd RF BW: Most of the issues identified for the case of 1st RF BW also remain valid for the case of the 2nd RF BW. In addition, the size of the 2nd RF BW can be UE specific and depend on a) the numerology used in a specific band, b) the FFT size that is supported by the UE 200 and c) the data requirements for the UE 200. Further, each bandwidth part is associated with the specific numerology (i.e., sub-carrier spacing, Cyclic Prefix (CP) type). The base station 100 can configure the single carrier operating the BW to the UE 200 based on an indication by the UE 200 of its capability regarding its hardware aspects such as the supported FFT size or the RF BW. These issues are more prominent for the 2nd RF BW as it is considered to be much wider than the 1st RF BW and extra emphasis is necessary on the configuration of the 2nd RF BW region.

Just like the case of 1st RF BW, the measurement gaps need to account for the time durations needed for re-tuning (if needed, for example in inter-carrier/inter-frequency cases) when the UE 200 operates in the 2nd RF BW.

In addition, the 2nd RF BW need not be contiguous considering that it is very wide (e.g. each contiguous allocation may be on orders of 100 MHz which may be supported by a single RF chain and the overall allocation may be on orders of 1 GHz). Depending on the RF implementation and the RF capabilities of the UE 200 (and exchanged as part of the UE capability information), the UE 200 may be allotted non-contiguous allocations inside the very wide NW bandwidth. All allocations given to the UE in this manner together constitute the definition of the 2nd RF BW. Different from LTE, the measurement gap settings in the New Radio (NR) should be based on the RRM BW configurations and the 1st, 2nd RF BW configurations even in the case of the intra-frequency measurements. Depending on the gap between the 1st and 2nd RF BW, the scheduling can account for the cross-slot scheduling. However, the cross-slot scheduling can be complex due to multiple HARQ processes to be accounted for. The UE 200 can use a timer-based de-activation of the 2nd RF bandwidth to avoid excessive power consumption. Else, an explicit and fast signaling based on DCI/MAC-CE is preferred from the base station 100 to avoid the UE 200 from using a lot of power. This signaling should be at min-slot/symbol level as shown in the FIG. 2. In an embodiment, the active time period is indicated by the base station 100 using at least one of the explicit DCI signaling, an implicit DCI signaling, a MAC CE signaling, a time pattern, and a DRX signaling.

Figure 3:
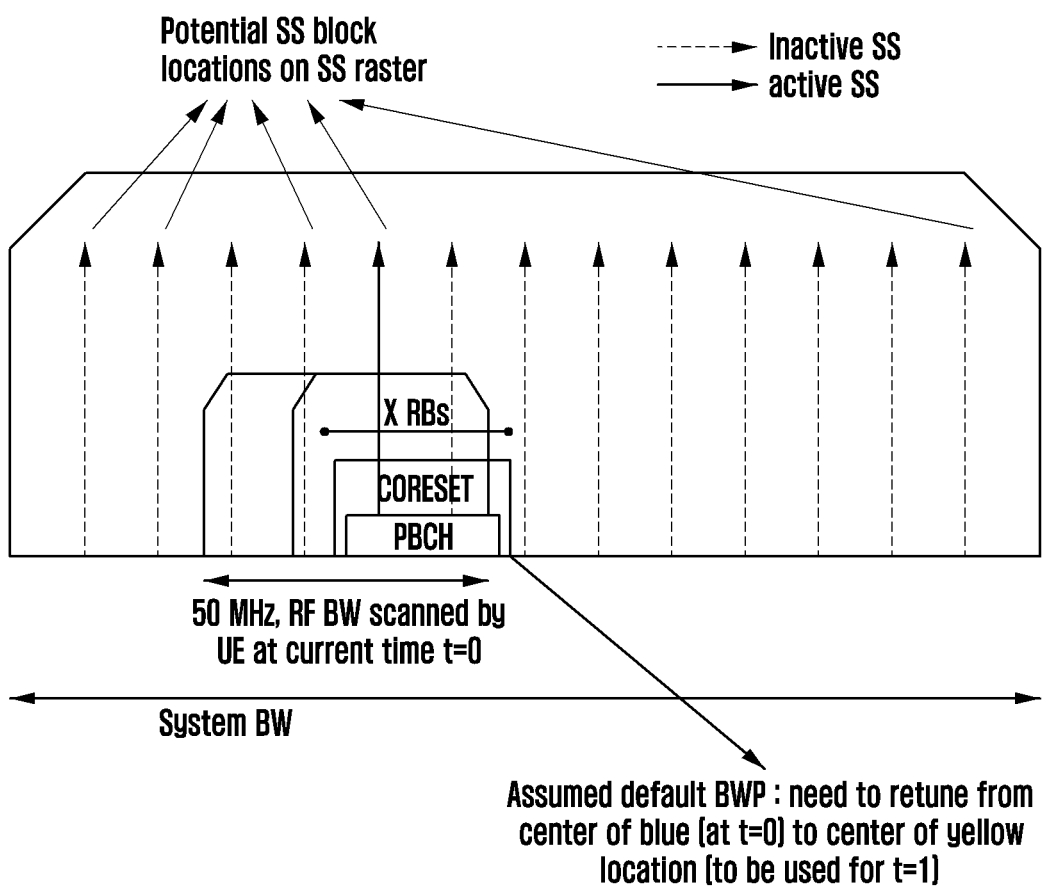
FIG. 3 illustrates various bandwidths involved in the UE operations, according to an embodiment as disclosed herein.

FIG. 3 illustrates scanning of bandwidth by the UE 200, according to embodiments as disclosed herein. Consider that the UE 200 scans the SS raster and is now looking at a 50 MHz channel BW (minimum NR channel BW, say) with a red-inactive SS (potential SS block location) as shown in FIG. 3. While doing correlations, UE finds the green active SS. Now if CORESET alone is assumed to be located around the green active SS then the number of times a UE must retune may be less than when UE assume that an entire BWP is centered on the green active SS. For the case of the entire BWP assumption, UE will most certainly have to retune. But for the case of CORESET centering, UE may have to tune less number of times compared to earlier option. Hence, upon detecting SS block a UE may assume a) CORESET of X RB size is located around the same center SS location, wherein the value of X may be defined in the specification a priori, or indicated to UE explicitly or implicitly via an index to a table defined in the specifications.

b) A default BWP of size, say minimum channel BW or some other fixed BW, is centered on this SS location.

There are several reasons to support multiple BW part activation at a given time instant for a UE. While contiguous is definitely preferred, some of the use cases mentioned below indicate the need for activating multiple BW parts.

Figure 4:
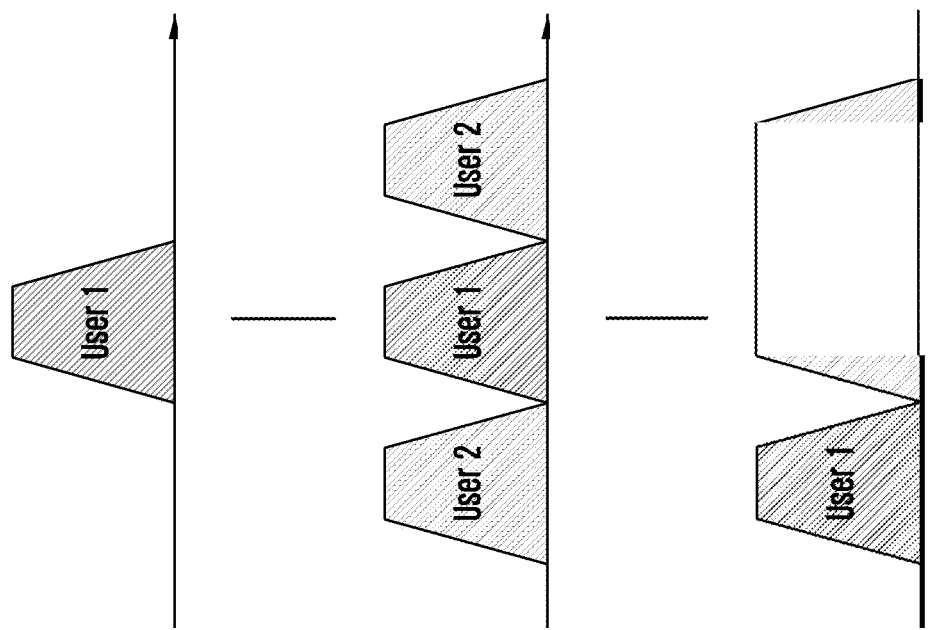
FIG. 4 illustrates example of operation for multiple active BW parts, according to embodiments as disclosed herein.

FIG. 4 illustrates examples of operation for multiple active BW parts, according to embodiments as disclosed herein.

In FIG. 4, user 1 is scheduled initially on BWP-1. Then User 2 is scheduled. Instead of waiting for a wide contiguous BWP to be available to schedule User-1, it may be scheduled on the configured BWP and over time it can be configured to monitor a wide contiguous BWP in order to get the full benefits of BW adaption. Another motivation to support multiple active BW parts is for the user to support PDSCH scheduling on one of the BWP while it can simultaneously measure CSI-RS on other BW part to enable the gNB to schedule it on other BW parts over time. A similar design helps for the case of uplink scheduling and SRS transmission (if simultaneous PUSCH and SRS or PUCCH and SRS is supported). Note that similar to SRS fast carrier switching, SRS fast switching needs to apply to BW parts in order to enable frequency selective UL scheduling (and DL scheduling in TDD). Functionally, SRS fast carrier switching and SRS fast BW part switching are same. This again depends on if the UE can support these BWP simultaneously. GC-PDCCH (group common control channel) can provide TPC commands for periodic SRS transmissions across the BWP and TPC commands and trigger requests for aperiodic SRS transmissions for fast BWP switching. This enables flexible and improved scheduling across BWPs. Furthermore, From a CA UE perspective, it is straightforward to support multiple active BWPs simultaneously within a wideband NR carrier.

Three options are identified for the indication of active DL/UL bandwidth part(s). As part of option 1, an implicit method can be achieved by associating resource allocation fields in scheduling assignment. For example, when the resource allocation is more than certain amount, it triggers UE to expand the bandwidth. Implicit refers to cases where UE 200 can understand the BWP size based on resource allocation. However, if there are 2 BWP of same size that can fit this resource allocation among the configured BWP for the UE 200, it is not clear which one the UE 200 will choose. Implicit can work only where the UE 200 has to go to fallback BWP (default BWP) or it can expand the BWP size around the current existing BWP center frequency. Else, there may be some confusion. Explicit DCI indication refers to indicating the center frequency or starting RB of the configured BWP which will be activated. Time-pattern based mechanisms can cause issues with the UE 200 and gNB synch unless it is some SPS type mechanisms and can also cause more power consumption since un-necessarily turning on BWP for some time also can cause some loss of battery in the UE 200. However, if some strong use cases are found, some RRC configuration to indicate a BWP being active for some time and then going back to default BW part type mechanisms may be studied. If the time pattern synch misses between the UE 200 and gNB, then appropriate fallback mechanisms are needed.

A typical example of MAC CE based signaling (Option 2) is LTE Scell activation/deactivation command for CA operation. Regardless of above options, upon gNB indication of active BWP(s), the UE 200 confirmation would be needed in order to avoid any potential misalignment between gNB and UE. In order to accommodate the transition time for UE bandwidth adaptation/BWP activation, the timing gap between the UE reception of the indication and its application should be wide enough. The minimum required timing gap would depend on specific operation scenario. For example, as RAN4 pointed out, the total transition time should include AGC settling time in case of multiple-carrier operation. Flexible timing control can be supported via timing indication in the DCI (both same-slot and cross-slot scheduling).

In option 3, slot format may impact the timing. For instance, when slot n contains both DL and UL part and the UE 200 receives the indication of bandwidth adaptation at slot n, the UE 200 may need to suspend the bandwidth adaptation until the end of UL part for potential UL transmission. The signaling aspects for bandwidth adaptation/BWP activation are tightly coupled with control channel design and scheduling/HARQ operation. As RAN1 already agreed to support the timing indication (i.e., PDCCH to PDSCH, PDCCH to PUSCH, PDSCH to PUCCH time difference) and slot format related information, bandwidth adaptation/BWP functionality should be taken into account when the signaling details are specified.

Figure 5:
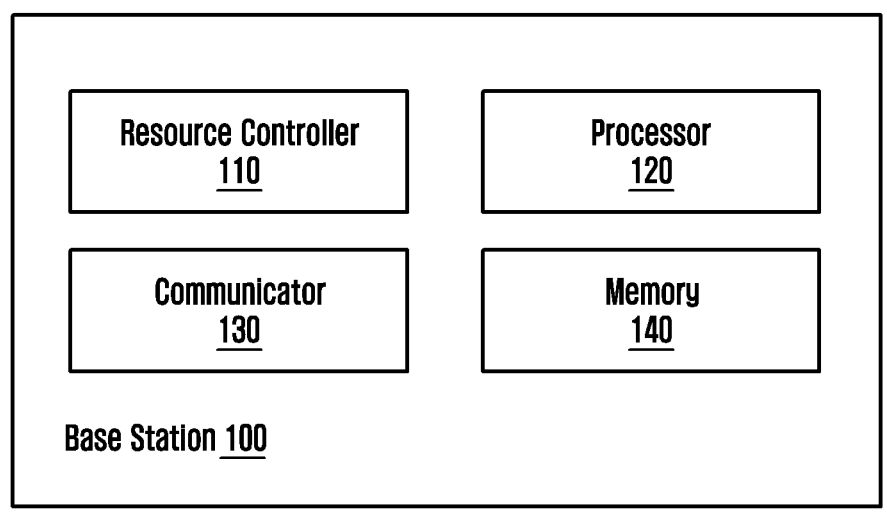
FIG. 5 is a block diagram illustrating a base station, according to an embodiment as disclosed herein.
Figure 6:
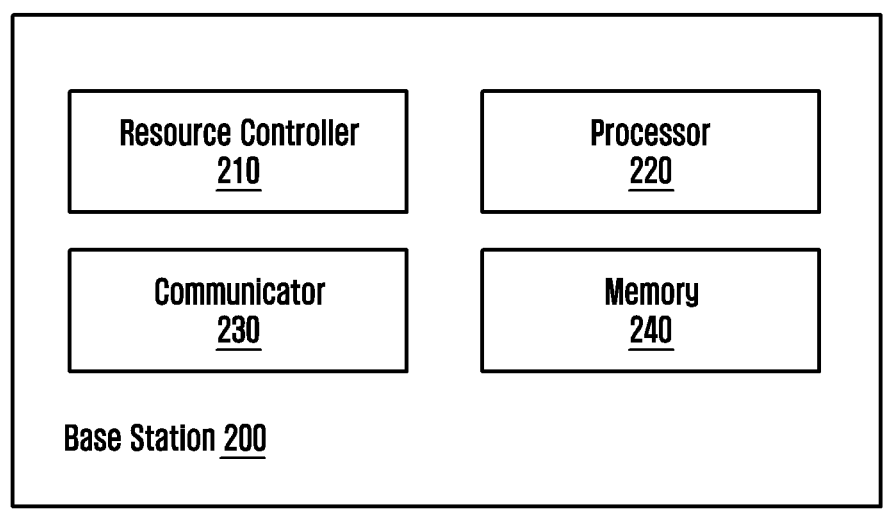
FIG. 6 is a block diagram illustrating the UE, according to an embodiment as disclosed herein.

FIG. 5 is a block diagram illustrating the base station 100, according to an embodiment as disclosed herein. In an embodiment, the base station 100 includes a resource controller 110, a processor 120, a communicator 130, and a memory 140. The resource controller 110 is communicated to the memory 140, the processor 120 and the communicator 130. In an embodiment, the resource controller 110 is configured to allocate the resource for the data transmission for the UE 200 in the two-step frequency-domain assignment process as a) indicating one or more bandwidth part, and b) indicating at least one RB within the one or more bandwidth part.

In an embodiment, the resource controller 110 is configured to allocate the resource for the data transmission from the UE 200 by indicating at least one bandwidth part in a total bandwidth supported by the UE, indicating a PDCCH and a PDSCH according to a configured subcarrier spacing and a CP length within the at least one bandwidth part and indicating a number of Resource Blocks (RBs) within the at least one bandwidth part. Each of the at least one bandwidth part in the total bandwidth supported by the UE is allocated to support different numerology. The number of RBs in each of the at least one bandwidth parts is determined based on a numerology and a size associated with corresponding bandwidth part. A size of a groups of the RBs depends on a duration of the data transmission.

In an embodiment, the number of RBs are indicated using one of different DCI formats, a flag in a DCI format for interpreting a RA type, a flag in a DCI format for interpreting an allocation of RBs from among a defined groups of RBs sizes, explicit indication of an allocation of RBs via a DCI and an implicit determination based on a size of a configured bandwidth part.

In an embodiment, the resource controller 110 identifies whether an allocation of the RBs for each of the bandwidth parts are one of same and different. The resource controller 110 causes to perform MU-MIMO multiplexing when the size of the group of the RBs for each of the bandwidth parts are same and signal UEs about an allocation of the RBs to be used and perform MU-MIMO multiplexing.

In an embodiment, a bandwidth part comprises a CORESET at a default location defined based on a size of the at least one bandwidth part. The PDSCH and the corresponding PDCCH are transmitted within a same bandwidth part when a PDSCH transmission starts no later than K symbols after an end of the PDCCH transmission.

In an embodiment, the PDSCH and the corresponding PDCCH are transmitted within a different bandwidth parts when a PDSCH transmission starting more than K symbols after an end of the corresponding PDCCH.

In an embodiment, the resource controller 110 is configured determining by a base station whether a reference point requires one of Common PRB indexing and a Local UE specific PRB indexing; and performing by the BS one of, indicating to the UE 200 via a RMSI about the reference point for the common PRB indexing for RS generation, and indicating to the UE 200 via a one of a RRC signaling and a UE specific signaling about the reference point for the local specific PRB indexing for a resource allocation.

In an embodiment, the resource controller 110 is configured for allocating the resource for a data transmission from the UE 200 by:
  a. identifying a discontinuous spectrum region;
  b. identifying a BW part that supports a SS block
  c. activating a secondary BW part without SS block
  d. configuring a CSI-RS location for measurements on the secondary BW part without SS block for the UE
  e. indicating to the UE the CSI-RS location and not to use SS on the secondary BW part.

The processor 120 is configured to execute instructions stored in the memory 140 and to perform various processes. The communicator 130 is configured for communicating internally between internal hardware components and with external devices via one or more networks. The communicator 130 is configured for communicating with the resource controller 110 to manage the resource in the wireless communication system 1000.

The memory 140 also stores instructions to be executed by the processor 120. The memory 140 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 140 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 140 can be configured to store larger amounts of information than the memory. In certain examples, a non-transitory storage medium may store data that can, over time, change (e.g., in Random Access Memory (RAM) or cache).

Figure 7:
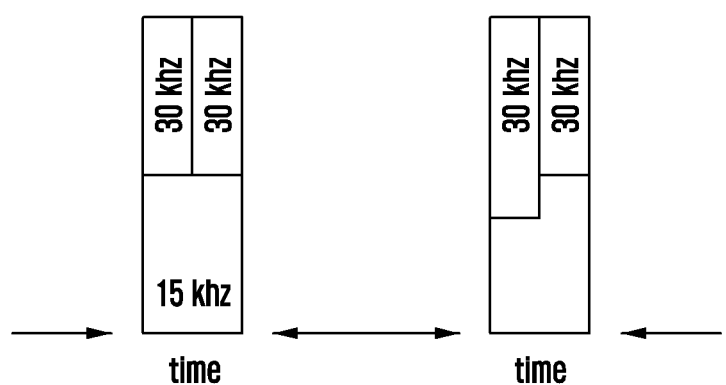
FIG. 7 illustrates overlapping of BW parts being configured dynamically across time, according to embodiments as disclosed herein.

Although the FIG. 7 shows various hardware components of the base station 100 but it is to be understood that other embodiments are not limited thereon. In other embodiments, the base station 100 may include less or more number of components. Further, the labels or names of the components are used only for illustrative purpose and does not limit the scope of the invention. One or more components can be combined together to perform same or substantially similar function to manage the resource in the wireless communication system 1000.

Figure 8:
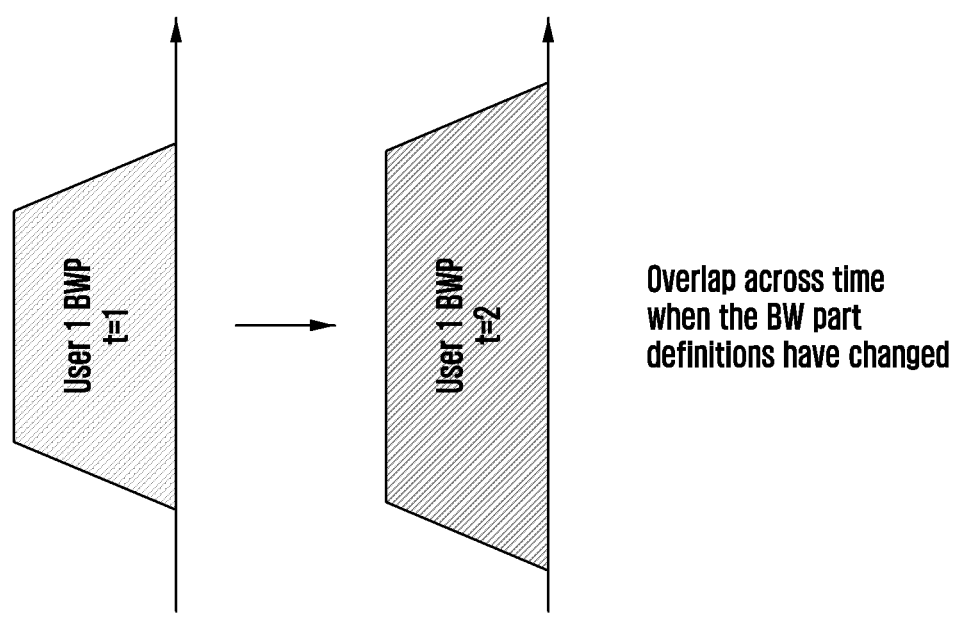
FIG. 8 illustrates overlapping of BW parts across time for one UE, according to an embodiment as disclosed herein.

FIG. 8 is a block diagram illustrating the UE 200, according to an embodiment as disclosed herein. In an embodiment, the UE 200 includes a resource controller 210, a processor 220, a communicator 230, and a memory 240. The resource controller 210 is communicated to the memory 240, the processor 220 and the communicator 230.

In an embodiment, the resource controller 210 is configured for configuring the resource for a data transmission by:

f. configuring at least one bandwidth part indicated by a base station in a total bandwidth supported by the UE;

g. configuring a PDCCH and a PDSCH according to a configured subcarrier spacing and a CP length within the at least one bandwidth part indicated by the base station; and h. configuring at least one Resource Block (RB) within the at least one bandwidth part indicated by the base station.

In an embodiment, a bandwidth part comprises a CORESET at a default location defined based on a size of the at least one bandwidth part. The PDSCH and the corresponding PDCCH are transmitted within a same bandwidth part when a PDSCH transmission starts no later than K symbols after an end of the PDCCH transmission.

In an embodiment, the PDSCH and the corresponding PDCCH are transmitted within a different bandwidth parts when a PDSCH transmission starting more than K symbols after an end of the corresponding PDCCH.

In an embodiment, the UE 200 determines that a size of the bandwidth part is one within a frequency range and re-tunes the bandwidth part to a location where a SS block exists. Each of the at least one bandwidth part in the total bandwidth supported by the UE are allocated to support different numerology.

In an embodiment, the resource controller 210 tunes to a frequency range, determines an active bandwidth part from a set of bandwidth parts configured by a base station for a data transmission from the UE 200 and performs the data transmission within the active bandwidth part using associated numerology of the active bandwidth part. The UE 200 does not span the frequency range larger than the bandwidth part of the UE 200 in a component carrier.

The processor 220 is configured to execute instructions stored in the memory 240 and to perform various processes. The communicator 230 is configured for communicating internally between internal hardware components and with external devices via one or more networks. The communicator 230 is configured for communicating with the resource controller 210 to manage the resource in the wireless communication system 1000.

The memory 240 also stores instructions to be executed by the processor 220. The memory 240 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 240 may, in some examples, be considered a non-transitory storage medium. The term "non-transitory" may indicate that the storage medium is not embodied in a carrier wave or a propagated signal. However, the term "non-transitory" should not be interpreted that the memory 220 is non-movable. In some examples, the memory 240 can be configured to store larger amounts of information than the memory. In certain examples, a non-transitory storage medium may store data that can, over time, change (e.g., in Random Access Memory (RAM) or cache).

Although the FIG. 8 shows various hardware components of the UE 200 but it is to be understood that other embodiments are not limited thereon. In other embodiments, the UE 200 may include less or more number of components. Further, the labels or names of the components are used only for illustrative purpose and does not limit the scope of the invention. One or more components can be combined together to perform same or substantially similar function to manage the resource in the wireless communication system 1000.

FIG. 7 illustrates overlapping of BW parts being configured dynamically across time, according to embodiments as disclosed herein.

In order to allow for dynamic load sharing across various numerologies, the BW parts configured to a UE may be overlapping. However overlapping BW parts being active at same time can be handled when the CORESET configurations are appropriately handled. The CORESET can be in the common overlapping region. It can configure both the BWPs. The overlapping can be defined such that based on dynamic network loading the gNB can decide to use one BWP or another.

For the multiple numerology case, such a design can definitely help as the UE 200 may only support one numerology say 15 kHz and another set of UEs 200 may only support 30 kHz as an example. When one set of UEs 200 number increases over other, then the BW parts size can be dynamically changed as shown in FIG. 7.

FIG. 8 illustrates overlapping of BW parts across time for one UE, according to embodiments as disclosed herein. In addition, the BW parts can be defined dynamically such that they overlap across time. BWPs are configured in a specific manner. All indication can come via UE specific DCI. However the overhead can be very much. So group common PDCCH can also be used for indication of the various configurations.

Overlapping CORESETs may be defined as well for USS and CSS overlap as in LTE and for users with different BW ability, their BWP can be different sizes so their CORESET's can overlap. Only one of the CORESET will be used at a given time instant. Having such configurable sizes can help to improve the group common PDCCH configuration so that multiple users can be handled depending on the network loading. Consider a 20 MHz total BW. Two CORESETs can be defined and UE can know their locations. But only one will be used at a time. One CORESET can be 15 MHz and another can be 10 Mhz. Depending on network loading the gNB can decide which one to use. In LTE the PDCCH mapping was defined on full network BW.

Figure 9:
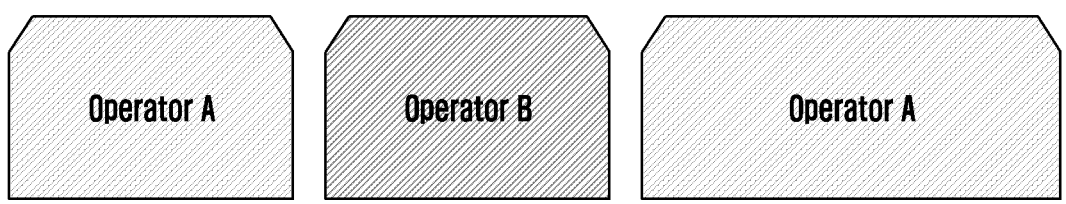
FIG. 9 illustrates inter operator spectrum sharing, according to embodiments as disclosed herein.

FIG. 9 illustrates inter operator spectrum sharing, according to an embodiment as disclosed herein. Typically the resource allocation can account for the power allocation using the RB sizes.

BSR is handled for all BWP together. Depending on the size of the BWP TA values can be maintained independently per BWP. HARQ across BWPs can be done. For PRACH per BWP may be performed by different RF chains if possible. BWP hopping can be defined for the PRACH cases to get TA values. Multi-BWP PRACH procedure can be used. Similarly when the SRS transmission for a BWP does not have TA or is not in a TAG, then CFRA order by PDCCH is needed. The PRACH procedure can follow the general design for PRACH transmissions in NR including the supported PRACH structures, power ramping, etc. The PRACH configurations on the switched-to BWP can be informed to the UE in advance by higher layer signaling.

In some embodiments, the RMSI contents of each SS block may be different. For example, the DC offset, which may be indicated in RMSI, is different for each SS block (as an offset from the SS block location for example). So even when cell ID is same, the RMSI contents may change across SS blocks. Since the UE 200 will then have to definitely read the RMSI per SS block, it is therefore clear that the locations of the CORESET for RMSI can be configurable (depending on the contents). If the contents of the RMSI will remain same across SS blocks (for example when DC offset will not be carried by RMSI), then the location of RMSI may remain same across multiple SS blocks and may be not confined within the BW of one NR-PBCH. Therefore, with respect to the multiple SS blocks issue, the CORESET may be configured within or outside the PBCH BW and the RMSI may be configured in some common location such that its BW is smaller than the minimum channel BW supported by all NR UEs. Further, to avoid too many retuning by the UE 200 and to keep the procedure simple, the CORESET for RMSI scheduling may be confined and configurable within a minimum channel BW that is supported by all NR UEs. Hence Alt-3 may be supported for the case of configuring multiple SS blocks within a wideband carrier when the contents of RMSI remain same across multiple SS blocks.

However, the CORESET may not be mandated to always span the entire minimum BW. For example, there may be reserved resources, another CORESET, etc. So, some signaling in the MIB is still needed to indicate the CORESET location but this signaling needs to only address a few predetermined sets of RBs in the BW part of the MIB. Once PBCH is identified we can have following: assume PBCH is in center of the BW-part; have indication inside the PBCH to indicate a CORESET location; PBCH may be in one corner of the BWP. The PBCH is located anywhere inside a minimum BWP so that additional indication is needed to indicate the start and end of BWP to identify CORESET location; few bits to indicate the CORESET location as an offset or exact location or functions thereof.

The size of the CORESET can be varying or fixed. Fixed reduces blind decoding for initial access. The location can be center of PBCH BW and is located around this.

For intra band carrier aggregation, one SS block is enough for operator A in one of the left or right BW while not receiving signals from operator B and with 1 RF chain.

If only one active BW part is configured at a time, CORESET must be associated with it. If multiple active BW parts are configured to a UE, there can be one or more CORESETs. The following solutions may be possible:

a) to avoid UE complexity, each active BW part may be associated with one or more CORESETs. PDCCH definitely exists in an active DL BW part. PDSCH may or may not in active DL BW part and Cross BWP scheduling is supported.

b) Group common PDCCH indicates the UE about the presence or absence of the PDCCH in a CORESET and the starting locations of the PDSCH in a given BWP c) A default BWP indicates whether or not there exists a PDCCH in another BWP. Else fallback DCI type operations to be supported using the default BWP.

If the CORESET duration is configured semi-statically, it is possible for a network to semi-statically indicate all CORESET durations. The UE 200 determines a starting symbol for a PDSCH reception in a bandwidth region based on the configured starting symbol for the bandwidth part. A combination of dynamic and semi-static signaling can be also considered. Starting symbols for PDSCH receptions in bandwidth parts that include un-configured CORESETs can be indicated semi-statically while starting symbols for PDSCH receptions in bandwidth parts that include configured CORESETs can be indicated dynamically. Higher layer signaling and/or UE-group common DCI can be used to indicate starting symbols for PDSCH transmissions in bandwidth parts that include un-configured CORESETs and/or not include CORESETs. UE-specific DCI and/or UE-group common DCI can be used to dynamically indicate starting symbols for PDSCH transmissions in bandwidth part that includes configured CORESETs.

With cross BWP scheduling, the total UE-specific search space in the current active BWP consists of individual UE-dedicated search spaces, each corresponding to each cross BWP. Separated search space should be applied for cross-BWP scheduling when DCI formats of multiple PDSCH/PUSCH BWPs have different payload size, and the shared search space should be considered for DCI formats with the same payload size. A function of the BWP indicator can be included in the search space design a. function(BWP_indicator) is used in calculation; similar to CIF for LTE CA b. offset can be used from starting index with this BWP indicator or its function (BWP_indicator)

c. hashing function can be used with this function of BWP_indicator.

The following options exist for configuring CORESETs before and after BW adaption:

a) Hopping be supported for CORESET b) The CORESET for USS or CSS may be reused. This is possible when there is an overlap before and after BW adaption across the BWP. This adaption may include previous CSS and or USS. Then depending on the locations configured, either only cell common/group common or UE specific DCi may be sent on either of these locations. i.e., if CSS is re-used: then cell specific/UE specific with new USS configuration/UE specific via CSS can be used. Similar can be done for USS case reuse When only partially included, then search space mapping needs to be changed as the aggregation levels etc. needs to be changed in order to accommodate various DCI.

c) New CORESET configuration: semi-statically indicated or dynamically indicated (actual location/offset from center/offset from previous CORESET/linked list based etc.). Or define implicit mechanism such as present in the center of the new BWP or edge of the BWP or based on BWP indicator etc.

d) If anything is missed, go back to default BWP for fallback PDCCH e) REG size can be changed implicitly or explicitly based on size of control resource set. This can be linked to CCE sizes. Similar to case of RBG size being linked to BWP size, REG size can also be a function of the configured BWP.

Resource sharing is supported by indication of starting OFDM symbol at different configured BW parts (multiple starting positions). Indication can be configured to be provided by UE-group common PDCCH, when applicable, or by UE-specific PDCCH otherwise. To reduce signaling overhead, some BW parts can be semi-statically configured and informed to UEs as not having a configured CORESET (e.g. PDSCH can start from symbol 0 in a slot in such BW parts). Since FDM of PDCCH and PDSCH is allowed, PDSCH can start from symbol 0 in a BWP. This resource sharing in BWP can be CORESET level or DCI level.

A DL anchor BWP carries UE-group specific DCI to indicate slot formats for the subsequent slots of individual BWPs. The UE group specific DCI may be common to all the BW parts, or BW part specifically transmitted. Another mechanism is where semi-static BWPs are configured in a DL anchor BWP, and the UE-group specific DCIs for the SFI are indicated within the individual BWP. Since group common PDCCH can indicate the slot formats for set of slots, the set of BWP configured can be indicated for a set of slots as well. Indication of PDSCH starting symbol at different BW parts is UE-common information and represents duplication when included in each UE-specific DCI format.

With cross BWP scheduling, the total UE-specific search space in the current active BWP consists of individual UE-dedicated search spaces, each corresponding to each cross BWP. Separated search space should be applied for cross-BWP scheduling when DCI formats of multiple PDSCH/PUSCH BWPs have different payload size, and the shared search space should be considered for DCI formats with the same payload size.

For cross BWP scheduling, A DCI format may or may not include a BWP indicator field (BIF). For example, a BIF field is not needed when different CORESETs or different, non-overlapping, monitoring periodicities for a CORESET are used for different BWPs. With configurable PDCCH candidates per CORESET and per BWP, this is a network implementation issue. In general, similar to other configurable fields for DCI formats in NR, a number of bits for a BIF field in a DCI can be configurable ranging from 0 to X. The largest value is to support the largest number of 2^X BWPs in NR. Also, due to different UE complexity and regulatory requirements, NR specifications should not assume any association between an UL BWP and a DL BWP capability for a UE (e.g. it should not be assumed that a UE with large DL BWP aggregation capability is always capable of UL BWP aggregation). A dynamic HARQ-ACK codebook determination can be based on the eCA operation using DAI and be employed for BWP operations.

Figure 10:
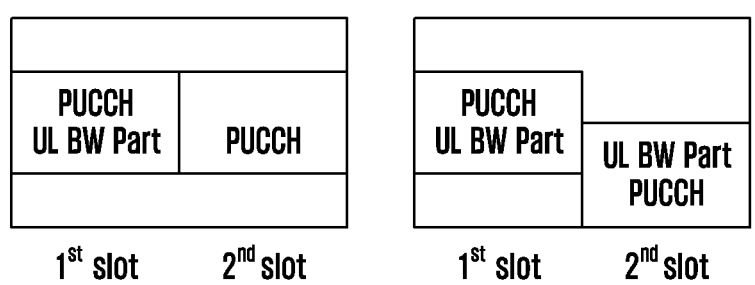
FIG. 10 illustrates PUCCH configured for UL BW Part, according to embodiments as disclosed herein.

FIG. 10 illustrates PUCCH configured for UL BW Part, according to embodiments as disclosed herein.

PUCCH and/or PUSCH is configured for the UL BW part. PUSCH is not always sent. PUCCH is not always sent when UCI can be piggybacked on PUSCH. Therefore, PUCCH and/or PUSCH can exist in UL BWP. For across slots, within BWP seems safer options considering timelines needed. Else across system BW can be allowed if there is enough time for re-tuning. Left figure: hopping with BWP Right figure: hopping across system BW; depends on hopping timeline.

The RBG size can depend on the transmission duration either implicitly or explicitly. For instance, when a short transmission must be supported, then a wider BW must be allocated to the user. In such cases, similar to LTE, bigger RBG sizes may be used for efficient resource allocation signaling overhead.

Since the NB UE does not need to know any information about the network BW/system BW, and its allocations are much smaller, it does not make sense to define RBG sizes based on the NW BW. In this aspect, Option 1 seems not a good mechanism to use for wideband system design especially considering the UE co-existence. The following options are identified to be more suitable for the RBG size indication and can be applied by network configuration for different BW part sizes:

(a) using different DCI formats (e.g. 'normal' DCI for 'normal' RA, 'fallback' DCI for small RA as in LTE), or (b) a flag in the DCI format for interpreting the RA type (e.g. type 0 or type 2), or (c) a flag in the DCI format for interpreting the RBG size from among a pre-defined RBG sizes (as per agreements the set of RBG size includes at least 2, [3,] 4, [6,] 8, 16), or (d) Explicit indication of the RBG size via DCI or (e) Implicit determination based on the configured BWP size.

Options (a) and (b) may be restrictive from designing a fully flexible NR system. From a flexibility point of view options (c) or (d) seem more attractive for UE multiplexing. Option (e) has some issues to be addressed for the cases when multiple BW parts are configured for the UE. It must be analyzed whether a UE can support different RBG sizes in different BWP or if one unified RBG size is decided based on minimum (or maximum) BWP size allotted. For example, this study is necessary as the pre-coding vectors have to be chosen appropriately within BWP and across BWP (if it is feasible to design them across BWP). Therefore, it must be further studied if all options are meaningful/needed.

Figure 11:
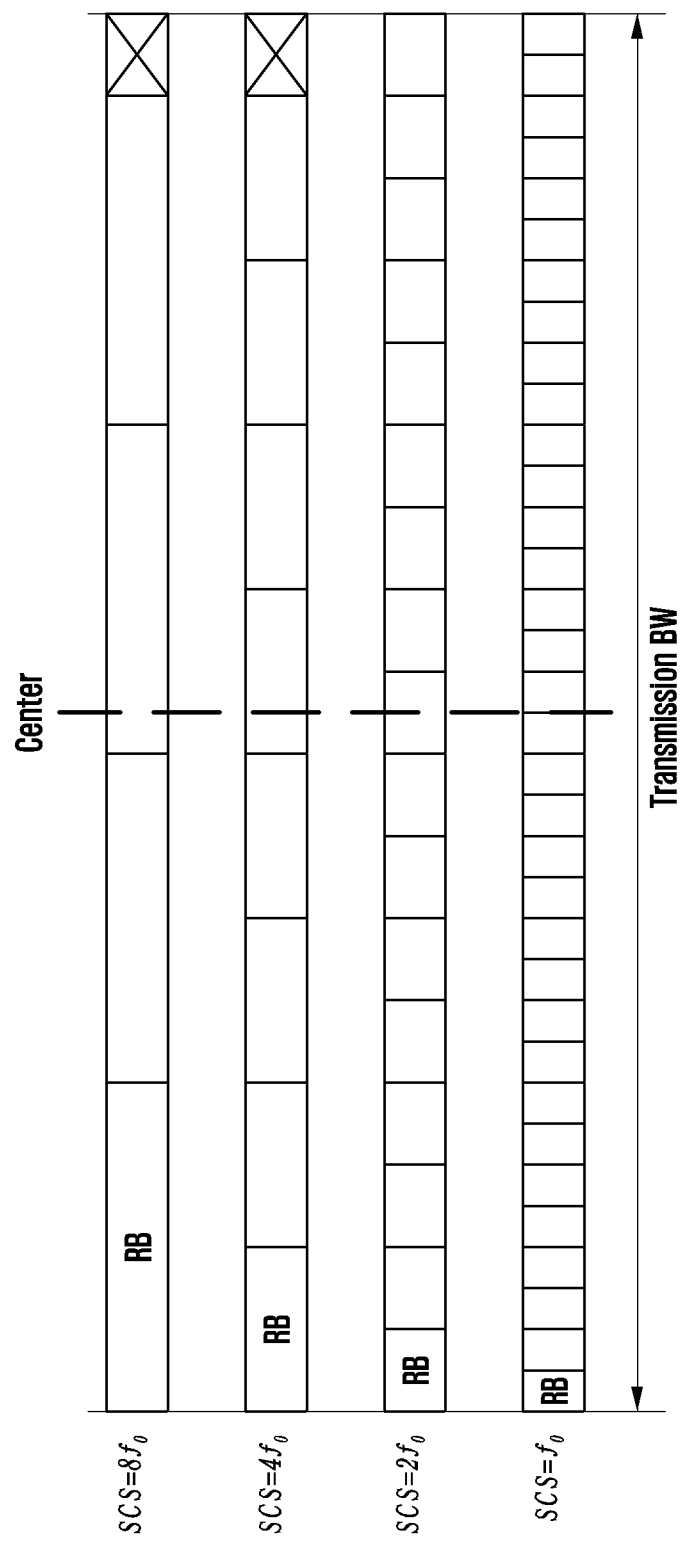
FIG. 11 illustrates alignment at end of frequency, according to embodiments as disclosed herein.

FIG. 11 illustrates alignment at end of frequency, according to embodiments as disclosed herein.

Figure 12:
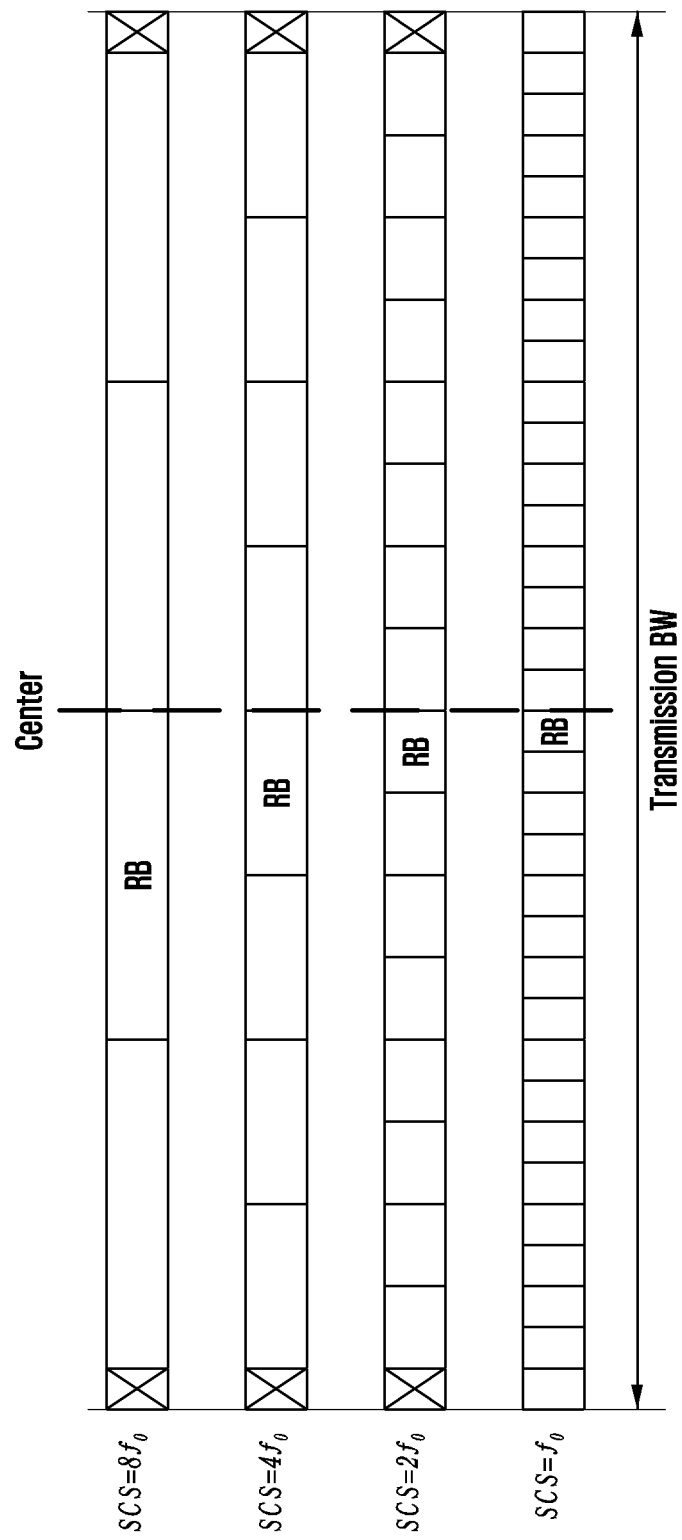
FIG. 12 illustrates alignment at centre of frequency, according to embodiments as disclosed herein.

FIG. 12 illustrates alignment at center of frequency, according to embodiments as disclosed herein.

As specified in agreed in RAN1 89, the same PRB grid structure for a given numerology is assumed for narrow band UEs, CA UEs and wideband UEs within a wideband NR carrier. This is crucial for WB and NB users co-existence—for multiplexing them efficiently, for instance to support MU-MIMO. The issue becomes more prominent for multiple numerologies used by WB and NB users. However it is not clear if any more new issues arise due to wideband operation as compared to the normal PRB grid alignment issue being discussed in NR. The following two alternatives exist and must be shortlisted in NR and can be used for wideband as well. Since a NB UE need not typically know much about the WB UE operations and the system BW, it seems more flexible to support Alt.2 for PRB grid alignment.

PRB indexing is a specification issue that can be handled by spec editors depending on the use case. For instance, for resource allocation, PRB indexing can be assumed within a BW part and need not be defined on a wideband basis. However, for the case of RS generation as it impacts UE multiplexing, the PRB indexing must be addressed. In LTE, the reference signal generation starts from RB 0 and is done until NRBDL,max which covers the full system BW (which is also the UE BW).

Figure 13:
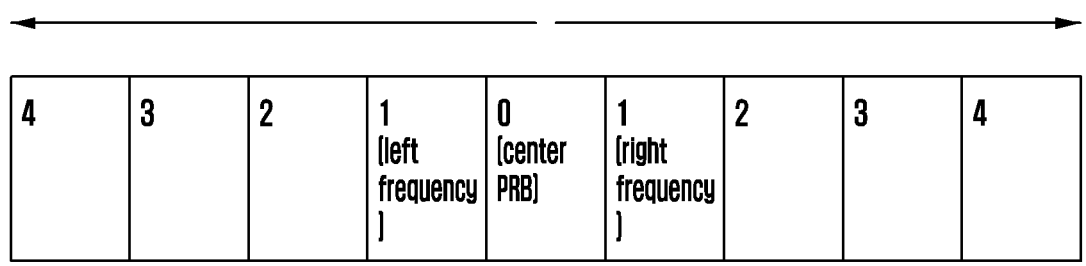
FIGS. 13 and 14 illustrate center frequency of wideband carrier, according to embodiments as disclosed herein.
Figure 14:
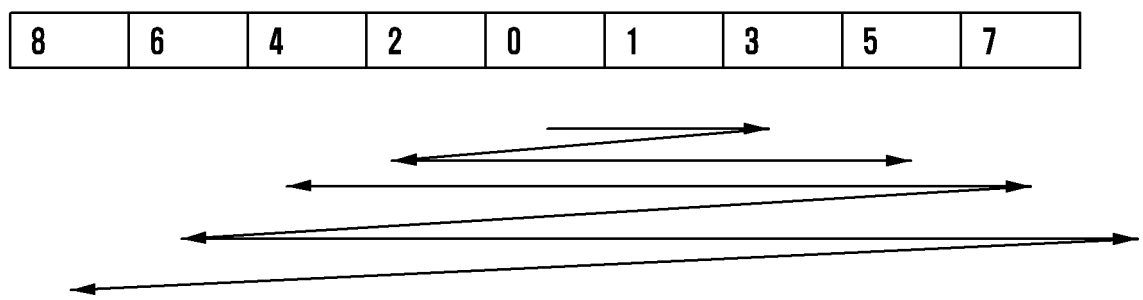

FIGS. 13 and 14 illustrate center frequency of wideband carrier, according to embodiments as disclosed herein. RS generation can be defined from a reference point such as:

a) Center frequency of wideband carrier b) A default SS block (or anchor SS block)

c) Edge of frequency (as in LTE)

In an embodiment, the reference point is one of a centre frequency of a wideband carrier, an edge frequency of a wideband carrier, a centre frequency of SS block, an edge frequency of the SS block, a channel number used for synchronization, a channel raster in terms of an Absolute Radio Frequency Channel Number (ARFCN), a centre frequency of RMSI BW and an edge frequency of RMSI BW.

Therefore, among the above, the safer option to satisfy all users is to define mapping from the wideband carrier center.

Some signaling methods will be needed to indicate time frequency resources for CSI-RS and SS blocks where the resources are not necessarily comprising a contiguous block of REs recurring in time. For example, multiple SS blocks used can occupy non-continuous time resources; and CSI-RS resources used for L3 mobility may also occupy non-contiguous time resources. For indicating UE to rate match around these signals, it seems natural to reuse the same signaling that is designed for configuring these signals. In LTE zero power CSI-RS indication followed similar procedure and hence a similar mechanism can be introduced for 5G-based wireless systems as well. For the indication of the zero power resources to rate match, at least the resource-setting based method should be supported. For SS blocks, indicating the number of actually transmitted SS blocks is an efficient way to indicate which time-frequency resources to rate match around, as well as to indicate those time frequency resources to make RRM measurements. Hence, it is proposed to use the signaling method for the purpose of rate matching, regardless of whether the UE 200 is further configured to measure signal quality using the indicated signals.

Figure 15:
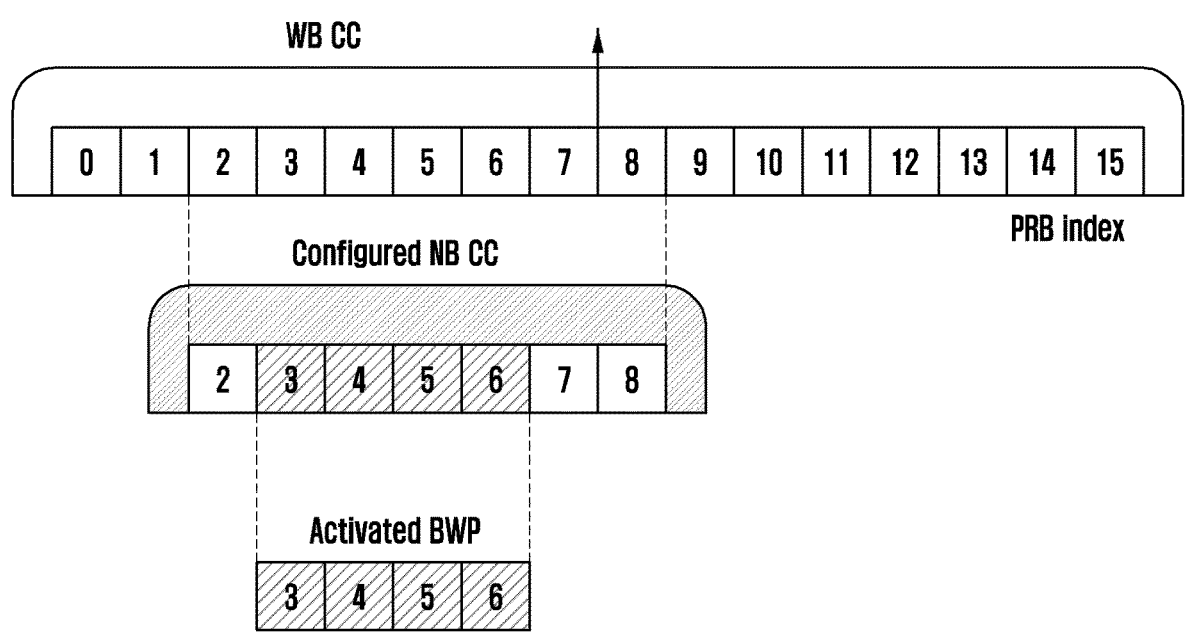
FIG. 15 illustrates PRB indexing per WB CC with common PRB indexing, according to embodiments as disclosed herein.
Figure 16:
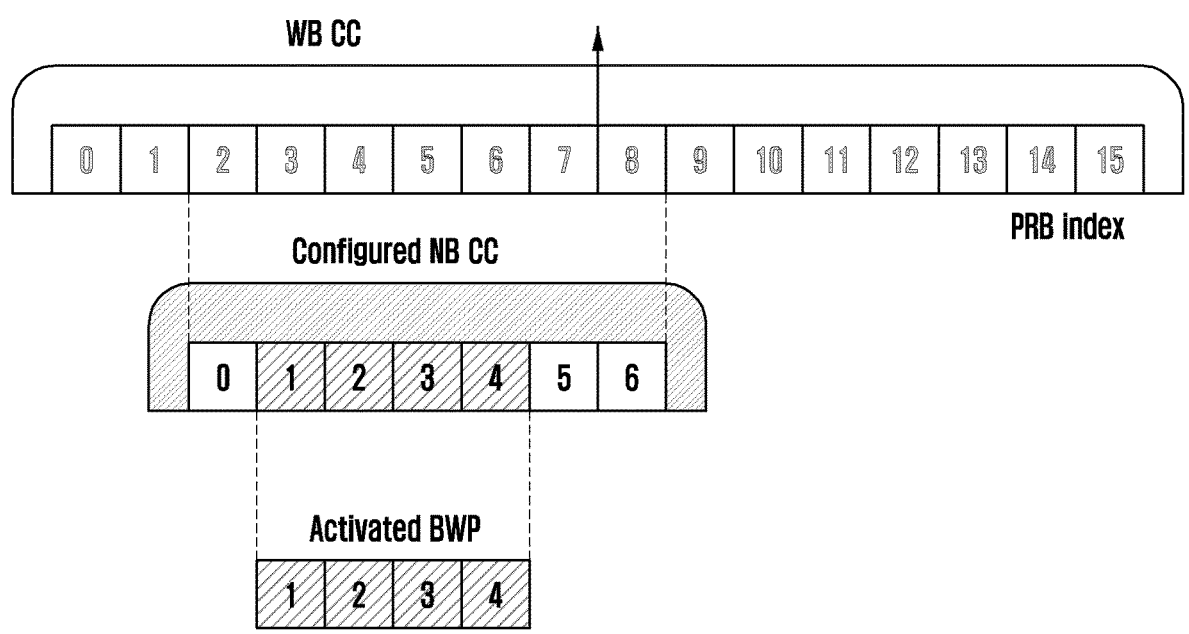
FIG. 16 illustrates PRB indexing per configured CC, according to embodiments as disclosed herein.
Figure 17:
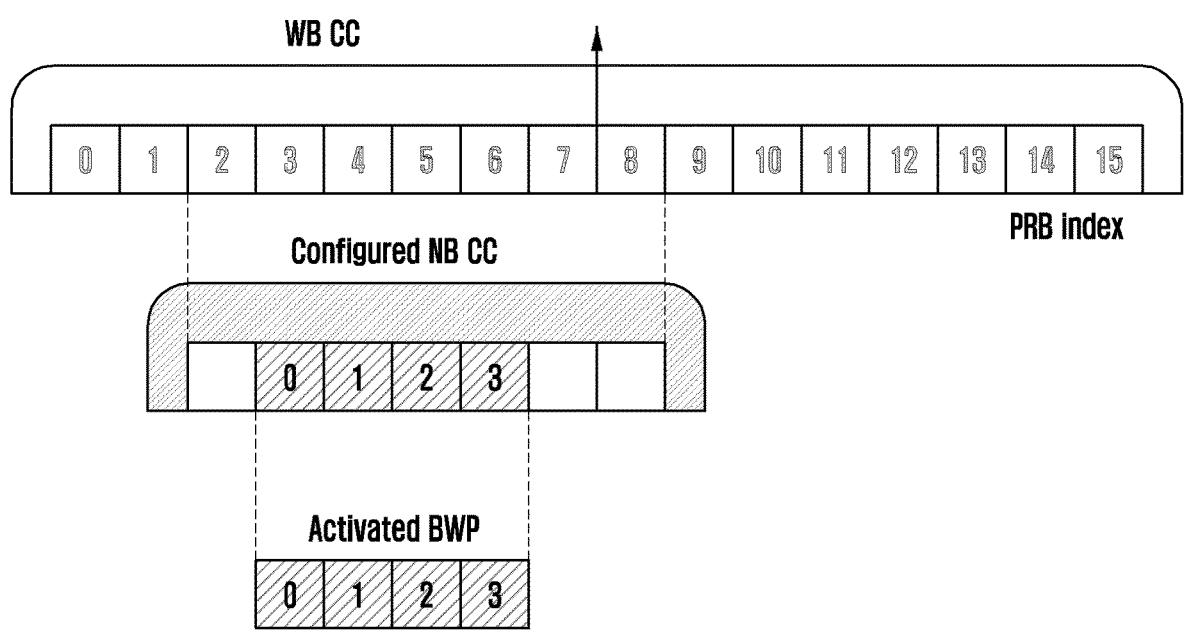
FIG. 17 illustrates PRB indexing per activated BW, according to embodiments as disclosed herein

FIG. 15 illustrates PRB indexing per WB CC with common PRB indexing, according to embodiments as disclosed herein. FIG. 16 illustrates PRB indexing per configured CC, according to embodiments as disclosed herein. FIG. 17 illustrates PRB indexing per activated CC, according to embodiments as disclosed herein.

For data transmission on PDSCH, there are three types of resource allocation in LTE. No matter which resource allocation type is chosen, it is always carried out based on PRB index which is automatically decided by operating CC BW, e.g., 20 MHz CC BW has 100 PRB. However, in NR, there could be various candidates which can be a baseline of PRB indexing range such as WB CC, NB CC, and BW part. The following scenarios is discussed in this regard:

Scenario 1: PRB indexing per WB CC (Common PRB indexing) where in this scenario, all UEs connected to gNB are allowed to have same PRB indexing regardless of their BW capability as shown in FIG. 15. It seems to be the simplest way to resolve PRB indexing issue for wider bandwidth operations. All UEs know one PRB index based on WB CC so that RS sequence and RBG grid can be generated over the PRB index. However, there may be an unnecessary DCI overhead issue that even if a UE capable of only small BW is configured to narrow band CC and activated to narrower BW part, DCI length for the UE is the same as that of WB UE. Further, if VRB-to-PRB distributed mapping for type 2 is used, the UE cannot have PRBs confined in configured NB CC or activated BW part since all VRBs are randomly interleaved within WB CC.

Scenario 2: PRB indexing per configured CC wherein this scenario (FIG. 16), each UE operates as a LTE UE on its configured CC. Compared to Scenario 1, DCI overhead can be reduced, but RS sequence generation between different CCs issue may arise. In addition, it still has virtual resource block (VRB)-to-physical resource block (PRB) distributed mapping issue when activated BW part is smaller than the configured CC.

Scenario 3: PRB indexing per activated BW wherein this scenario (FIG. 17), whenever different BW part is activated to a UE, the UE is newly assigned to its PRB index. Then, there seems no DCI overhead issue as well as distributed mapping issue. However, if one CORESET serves multiple BW parts with different BW size like cross carrier scheduling, there could be a blind decoding overhead issue due to different DCI length caused by different size of BW parts.

CSI-RS mapping should be specified both on wideband and narrow band manner. A CSI-RS transmission can be over the full DL BW (except for potential reserved resources) and a UE can measure CSI over a BW part when the UE 200 re-tunes to the BW part. CSI-RS transmission can also be only over the BW part where the UE is retuning. From the UE perspective, if CSI-RS measurements are mandated to occur only within the BW part, the two approaches are equivalent and can be handled by implementation. A narrow band UE may secure only sub-band measurements of a wideband RS and a CA UE may not make full use of wideband RS depending on the BWP configuration. While the sub-band measurements may be degraded when considering one-shot measurements, the measurement accuracy can be improved by obtaining measurements for a longer period of time.

Multi-BWP CSI report can have full CQI report for one BWP and differential ones for other BWPs as an offset. The UE can select M BWP CSI reports as configured by the network. UE can be configured with "N" BWP for CSI-RS measurements and "M" BWP measurements can be fed back to the network. To avoid confusion, the CORESETs for BWP with CSI-RS BWP are aligned.

A pattern may be established after each UE scheduling and be configured in SPS manner. Else two different patterns may be defined so that nothing is missed for PDCCH.

Another approach is to not have CORESET frequency hopping but instead the UE will retune to measure CSI based on a frequency hopping pattern in BW parts for CSI-RS receptions. After a CSI measurement, the UE can retune to the BW part of the CORESET to monitor the PDCCH. This mechanism needs to account for retuning timelines, inter band, intra band retuning etc.

Figure 18:
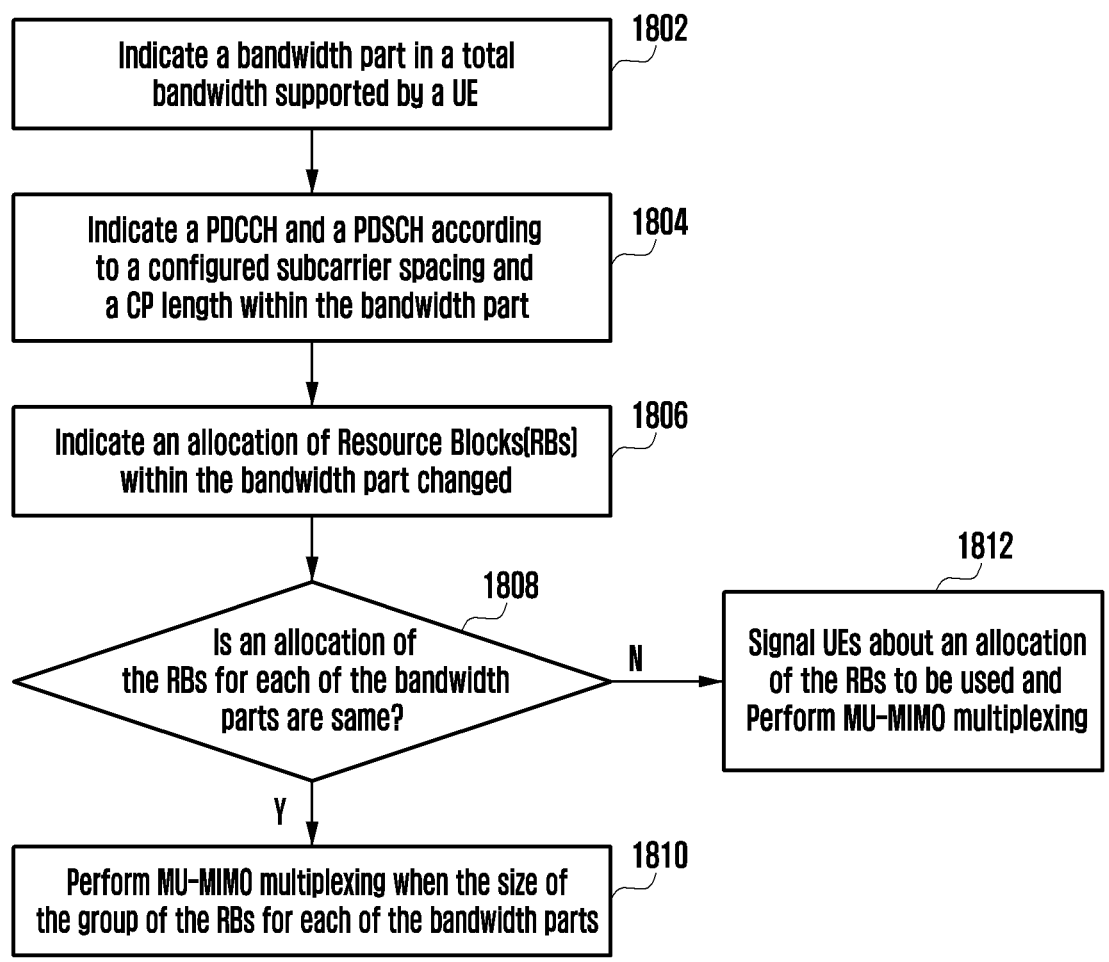
FIG. 18 is a flow diagram illustrating various operations, implemented on the base station, for managing the resource in the wireless communication system by two-step frequency-domain assignment process, according to embodiments as disclosed herein.

FIG. 18 is a flow diagram illustrating a method to allocate a resource for data transmission in the wireless communication system 1000 (shown in FIG. 1). At step 1802, the resource controller 110 (shown in FIG. 5) is configured to allocate the resource for the data transmission for the UE 200 in the two-step frequency-domain assignment process. At step 1804, the resource controller 110 indicates one or more bandwidth parts, and indicating at least one RB within the one or more bandwidth part.

FIG. 18 is a flow diagram illustrating a method to allocate a resource for data transmission in the wireless communication system 1000 (shown in FIG. 1). At step 1802, the resource controller 110 is configured to allocate the resource for the data transmission from the UE 200 by indicating at least one bandwidth part in a total bandwidth supported by the UE. At step 1804, the resource controller 110 is configured to allocate the resource for the data transmission from the UE 200 by indicating a PDCCH and a PDSCH according to a configured subcarrier spacing and a CP length within the at least one bandwidth part. At step 1806, the resource controller 110 is configured to allocate the resource for the data transmission from the UE 200 by indicating a number of Resource Blocks (RBs) within the at least one bandwidth part. Each of the at least one bandwidth part in the total bandwidth supported by the UE is allocated to support different numerology. The number of RBs in each of the at least one bandwidth parts is determined based on a numerology and a size associated with corresponding bandwidth part. A size of a groups of the RBs depends on a duration of the data transmission.

In an embodiment, the number of RBs are indicated using one of different DCI formats, a flag in a DCI format for interpreting a RA type, a flag in a DCI format for interpreting an allocation of RBs from among a defined groups of RBs sizes, explicit indication of an allocation of RBs via a DCI and an implicit determination based on a size of a configured bandwidth part.

At step 1808, the resource controller 110 identifies whether an allocation of the RBs for each of the bandwidth parts are one of same and different. The resource controller 110 causes to perform MU-MIMO multiplexing when the size of the group of the RBs for each of the bandwidth parts are same (step 1810) and signal UEs about an allocation of the RBs to be used and perform MU-MIMO multiplexing at step 1812 if the allocation is different. (step 1812)

Figure 19:
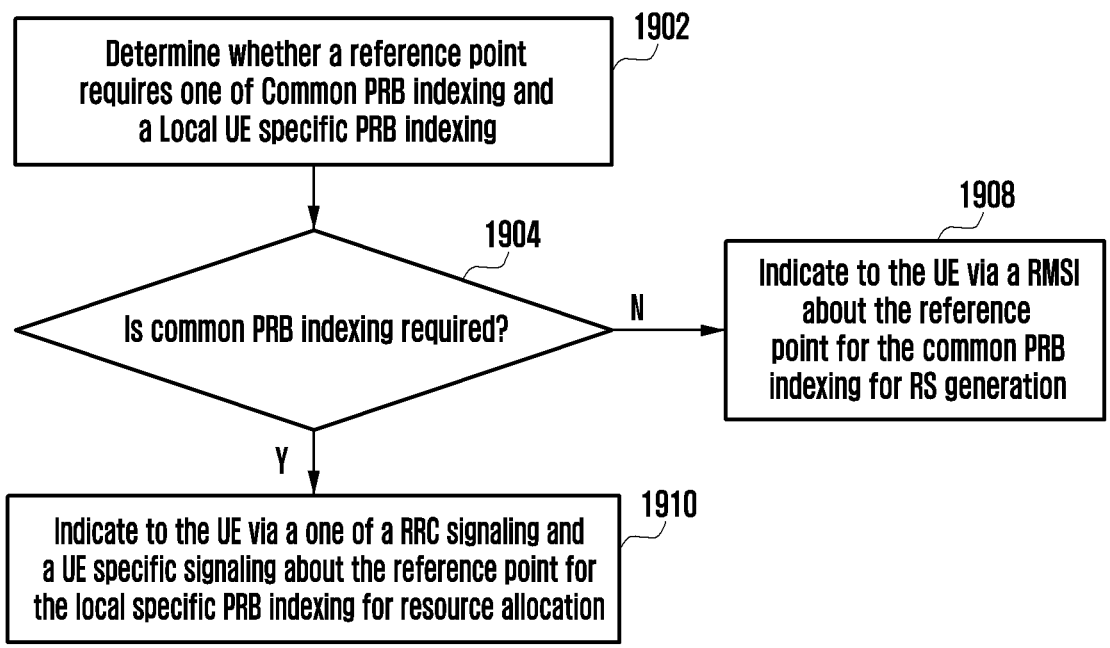
FIG. 19 is a flow diagram illustrating various operations, implemented on the base station, for managing the resource in the wireless communication system by determining whether a reference point requires one of Common PRB indexing and a Local UE specific PRB indexing, according to embodiments as disclosed herein.

FIG. 19 is a flow diagram illustrating a method to allocate a resource for data transmission in the wireless communication system 1000 (shown in FIG. 1). At step 1902 and 1904, the resource controller 110 determines whether a reference point requires one of Common PRB indexing and a Local UE specific PRB indexing. At step 1908 the resource controller 110 indicates to the UE 200 via a RMSI about the reference point for the common PRB indexing for RS generation. At step 1910, the resource controller 110 indicates to the UE 200 via a one of a RRC signaling and a UE specific signaling about the reference point for the local specific PRB indexing for a resource allocation.

Figure 20:
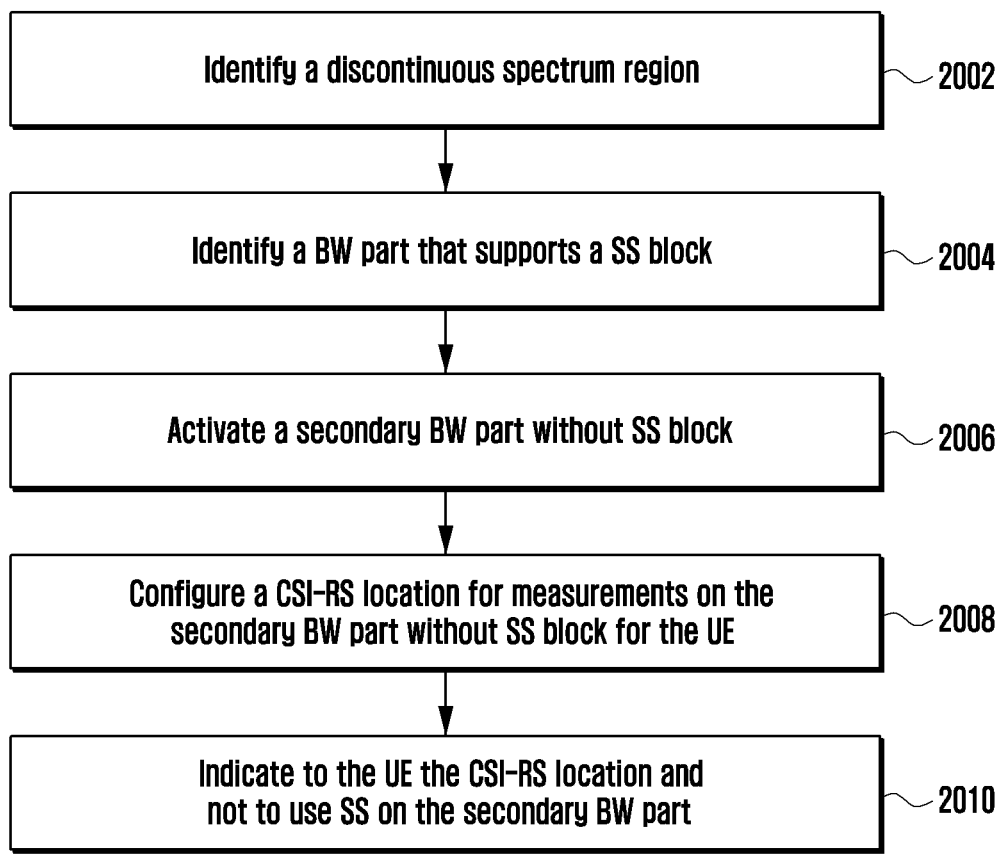
FIG. 20 is a flow diagram illustrating various operations, implemented on the base station, for managing the resource in the wireless communication system by identifying spectrum regions, according to embodiments as disclosed herein.

FIG. 20 is a flow diagram illustrating a method to allocate a resource for data transmission in the wireless communication system 1000 (shown in FIG. 1). In an embodiment, the resource controller 110 is configured for allocating the resource for a data transmission from the UE 200 by:

a. identifying a discontinuous spectrum regions (step 2002)

b. identifying a BW part that supports a SS block (step 2004)

c. activating a secondary BW part without SS block (step 2006)

d. configuring a CSI-RS location for measurements on the secondary BW part without SS block for the UE (step 2008)

e. indicating to the UE the CSI-RS location and not to use SS on the secondary BW part (step 2010).

Figure 21:
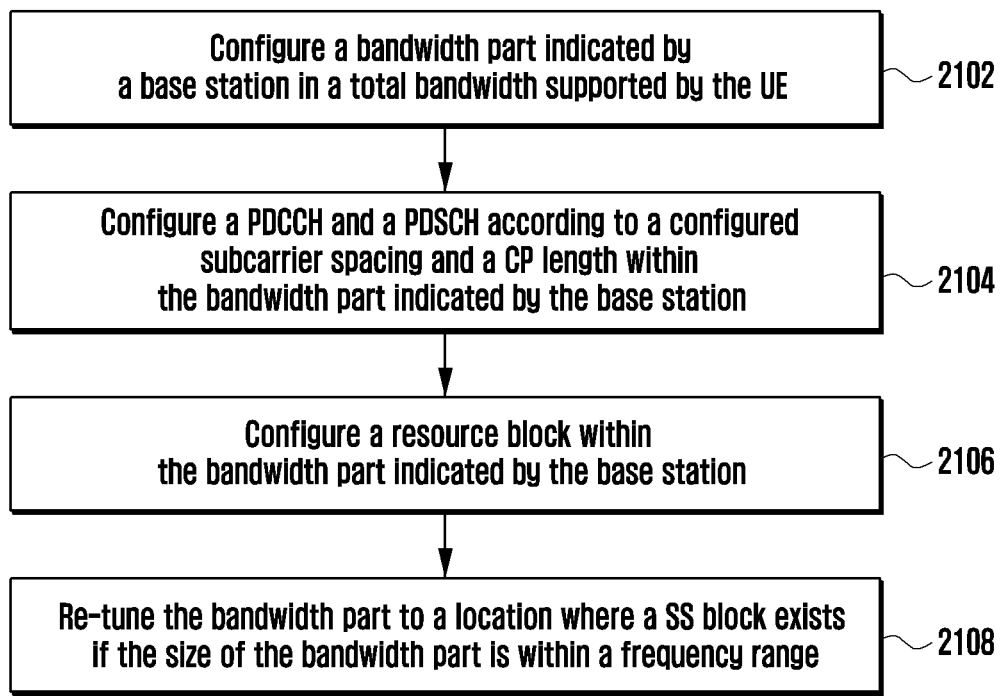
FIG. 21 is a flow diagram illustrating various operations, implemented on the UE, for managing the resource in the wireless communication by configuring RBs, according to embodiments as disclosed herein.

FIG. 21 is a flow diagram illustrating a method to allocate a resource for data transmission in the wireless communication system 1000 by the UE 200 (shown in FIG. 1). In an embodiment, the resource controller 210 is configured for configuring the resource for a data transmission by:

a. configuring at least one bandwidth part indicated by a base station in a total bandwidth supported by the UE (step 2102)

b. configuring a PDCCH and a PDSCH according to a configured subcarrier spacing and a CP length within the at least one bandwidth part indicated by the base station (step 2104)

c. configuring at least one Resource Block (RB) within the at least one bandwidth part indicated by the base station. (step 2106)

At step 2108, the UE 200 determines that a size of the bandwidth part is one within a frequency range and re-tunes the bandwidth part to a location where a SS block exists. Each of the at least one bandwidth part in the total bandwidth supported by the UE are allocated to support different numerology.

Figure 22:
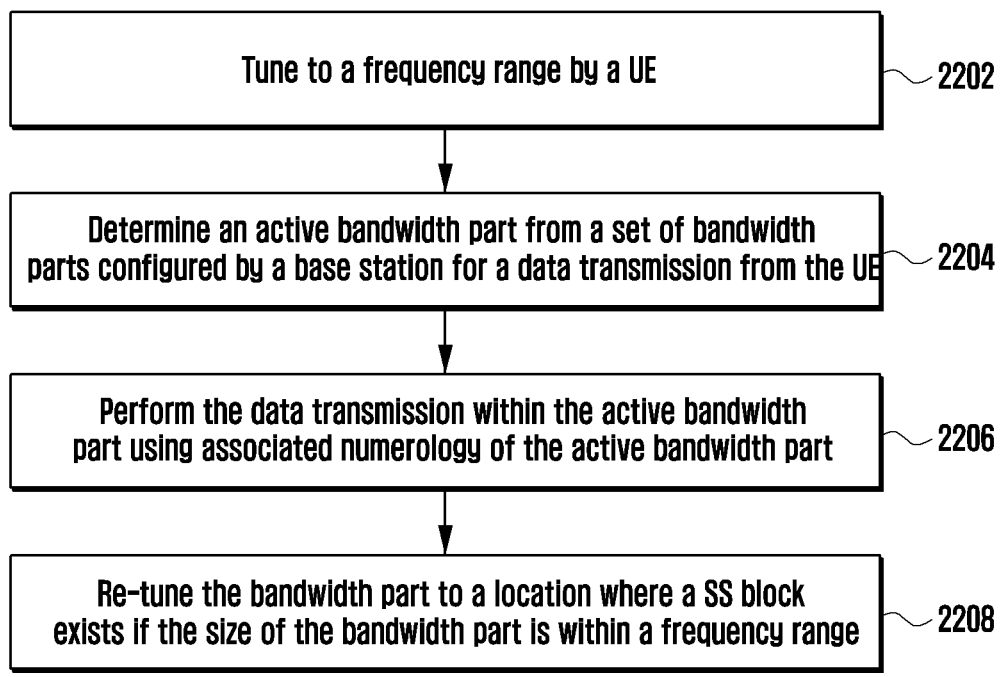
FIG. 22 illustrates is a flow diagram illustrating various operations, implemented on the UE, for managing the resource in the wireless communication by frequency tuning, according to embodiments as disclosed herein.

FIG. 22 is a flow diagram illustrating a method to allocate a resource for data transmission in the wireless communication system 1000 by the UE 200 (shown in FIG. 1). In an embodiment, the resource controller 210 tunes to a frequency range (step 2202), determines an active bandwidth part from a set of bandwidth parts configured by a base station for a data transmission from the UE 200 (step 2204) and performs the data transmission within the active bandwidth part using associated numerology of the active bandwidth part (2206). The UE 200 does not span the frequency range larger than the bandwidth part of the UE 200 in a component carrier. At step 2108, the UE 200 determines that a size of the bandwidth part is one within a frequency range and re-tunes the bandwidth part to a location where a SS block exists.

The embodiments disclosed herein can be implemented through at least one software program running on at least one hardware device and performing network management functions to control the elements. The elements shown in FIGS. 1-22 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method performed by a base station in a wireless communication system, the method comprising:
  transmitting, to a user equipment (UE), a first message comprising information on at least one bandwidth part (BWP) including first configuration information on a Physical Downlink Control Channel (PDCCH) and second configuration information on a Physical Downlink Shared Control Channel (PDSCH) via Radio Resource Control (RRC); and
  transmitting, to the UE, a second message comprising downlink control information (DCI) to be used for an BWP activation and including resource allocation information for scheduling of the PDSCH,
  wherein resource blocks (RBs) are identified by the resource allocation information, and
  wherein the at least one bandwidth part is associated with a subcarrier spacing and a cyclic prefix (CP) length.

2. The method of claim 1, wherein a resource allocation (RA), type of the RBs is identified based on a flag included in the transmitted DCI.

3. The method of claim 1, wherein a size of groups of the RBs is determined based on the information on at least one bandwidth part.

4. The method of claim 1, wherein the RBs are mapping from a carrier center.

5. A method performed by a User Equipment (UE) in a wireless communication system, the method comprising:
  receiving, from a base station, information on at least one bandwidth part (BWP) including first configuration information on a Physical Downlink Control Channel (PDCCH), and second configuration information on a Physical Downlink Shared Control Channel (PDSCH) via Radio Resource Control (RRC),
  receiving, from the base station, downlink control information (DCI) to be used for an BWP activation and including resource allocation information for scheduling of the PDSCH, and identifying resource blocks (RBs) by the resource allocation information,
wherein the at least one bandwidth part is associated with a subcarrier spacing and a cyclic prefix (CP) length.

6. The method of claim 5, wherein a resource allocation (RA), type of the RBs is identified based on a flag included in the received DCI.

7. The method of claim 5, wherein a size of groups of the RBs is determined based on the information on at least one bandwidth part.

8. The method of claim 5, wherein the RBs are mapping from a carrier center.

9. A base station in a wireless communication system, the base station comprising:
   a memory;
   a processor; and
   a controller communicatively coupled to the memory and the processor, the controller configured to:
      transmit, to a user equipment (UE), a first message comprising information on at least one bandwidth part (BWP) including first configuration information on a Physical Downlink Control Channel (PDCCH) and second configuration information on a Physical Downlink Shared Control Channel (PDSCH) via Radio Resource Control (RRC), and
      transmit, to the UE, a second message comprising downlink control information (DCI) to be used for an BWP activation and including resource allocation information for scheduling of the PDSCH,
   wherein resource blocks (RBs) are identified by the resource allocation information, and
   wherein the at least one bandwidth part is associated with a subcarrier spacing and a cyclic prefix (CP) length.

10. The base station of claim 9, wherein a resource allocation (RA), type of the RBs is identified based on a flag included in the transmitted DCI.

11. The base station of claim 9, wherein a size of groups of the RBs is determined based on the information on at least one bandwidth part.

12. The base station of claim 9, wherein the RBs are mapping from a carrier center.

13. A user equipment (UE) in a wireless communication system, the UE comprising:
   a memory;
   a processor; and
   a controller communicatively coupled to the memory and the processor, the controller configured to:
      receive, from a base station, information on at least one bandwidth part (BWP) including first configuration information on a Physical Downlink Control Channel (PDCCH), and second configuration information on a Physical Downlink Shared Control Channel (PDSCH) via Radio Resource Control (RRC),
      receive, from the base station, downlink control information (DCI) to be used for an BWP activation and including resource allocation information for scheduling of the PDSCH, and
      identify resource blocks (RBs) by the resource allocation information,
   wherein the at least one bandwidth part is associated with a subcarrier spacing and a cyclic prefix (CP) length.

14. The UE of claim 13, wherein a resource allocation (RA), type of the RBs is identified based on a flag included in the received DCI.

15. The UE of claim 13, wherein a size of groups of the RBs is determined based on the information on at least one bandwidth part.

16. The UE of claim 13, wherein the RBs are mapping from a carrier center.

* * * * *